United States Patent [19]

Yazawa et al.

[11] Patent Number: 5,432,920
[45] Date of Patent: Jul. 11, 1995

[54] STORE CONTROL METHOD WITH HIERARCHIC PRIORITY SCHEME FOR COMPUTER SYSTEM

[75] Inventors: Shigeko Yazawa; Tadaaki Isobe; Mihoko Hashiba; Katsuyoshi Kitai, all of Hadano, Japan

[73] Assignee: Hitachi, Ltd., Tokyo, Japan

[21] Appl. No.: 685,450

[22] Filed: Apr. 15, 1991

[30] Foreign Application Priority Data

Apr. 13, 1990 [JP] Japan .................................. 2-98205
May 25, 1990 [JP] Japan .................................. 2-136116

[51] Int. Cl.⁶ .......................................... G06F 13/16
[52] U.S. Cl. ...................................... 395/425; 395/325
[58] Field of Search ................. 395/425, 325; 364/200

[56] References Cited

U.S. PATENT DOCUMENTS

| | | | |
|---|---|---|---|
| 4,745,545 | 5/1988 | Schiffleger | 395/325 |
| 4,755,938 | 7/1988 | Takahashi et al. | 364/200 |
| 4,827,407 | 5/1989 | Nakatani | 364/200 |
| 4,843,543 | 6/1989 | Isobe | 364/200 |
| 4,870,569 | 9/1989 | Nakatani et al. | 364/200 |
| 5,043,981 | 8/1991 | Firoozmand et al. | 370/85.15 |
| 5,170,473 | 12/1992 | Ishida | 395/325 |

FOREIGN PATENT DOCUMENTS 0242882 10/1987 European Pat. Off. .
66660 3/1988 Japan .
62-251956 4/1988 Japan .

OTHER PUBLICATIONS

Mano, Morris M.; *Digital Logic and Computer Design;* Prentice Hall, Inc., New Jersey, 1979; pp. 274–276.

*Primary Examiner*—Jack B. Harvey
*Assistant Examiner*—Jack A. Lane
*Attorney, Agent, or Firm*—Fay, Sharpe, Beall, Fagan, Minnich & McKee

[57] ABSTRACT

A store control method for a computer system having a storage with independently accessible plural store banks, plural access request controllers for issuing access requests to the storage, and a store controller for transmitting the access requests to each store bank. The store controller has an access request priority determining circuit of plural stages for selecting the access requests in the order of higher priority for each store bank so as to determine the order of priority between the access requests in multiple stages on the basis of the access requests. Further, plural priority control circuits of each stage are provided for stepwise performing control of priority of the main store access requests issued by the vector data processor for each of the store banks. Access is made to the main storage by assuring the order between the vector elements constituting vector data by allowing each first priority control circuit to send the access requests to the priority control circuit of next stage. Furthermore, the priority control circuit of the n-th stage sends the access request from the plural priority control circuits of the (n−1)th stage while assuring the order of the priority control circuits of the (n−1)th stage.

11 Claims, 24 Drawing Sheets

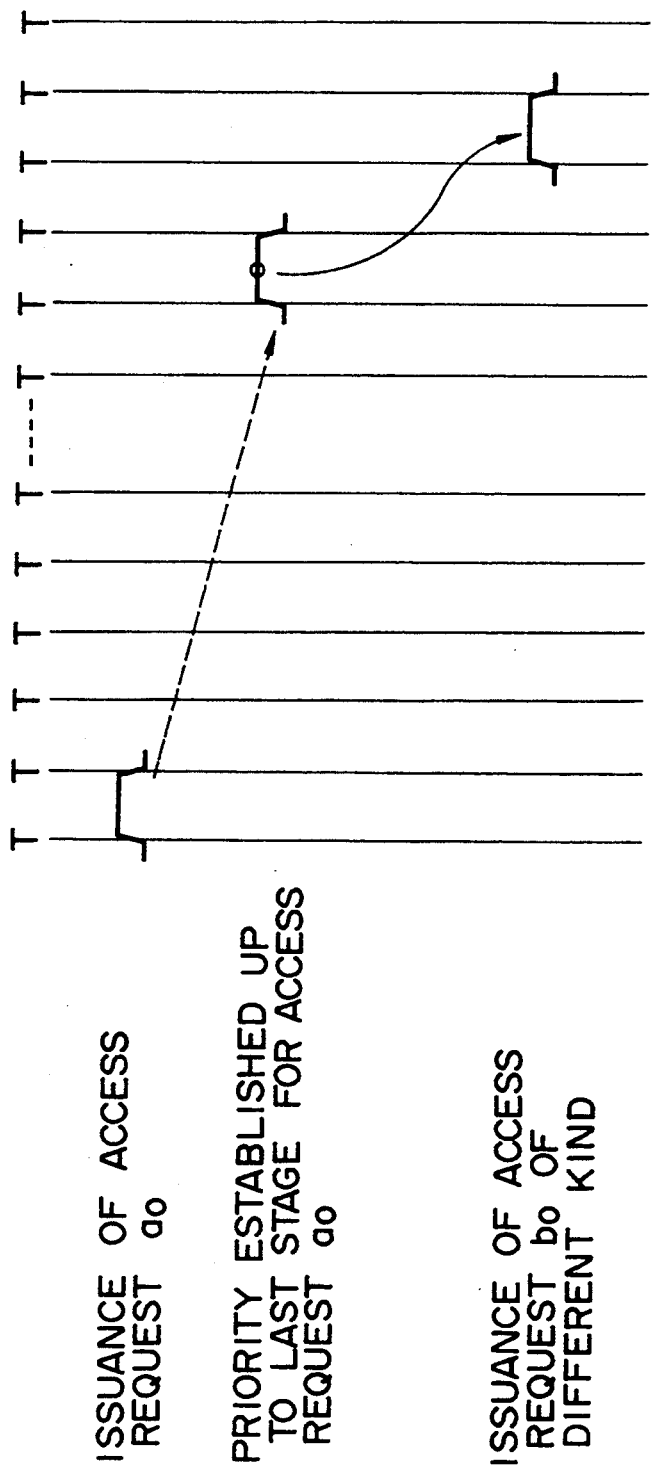

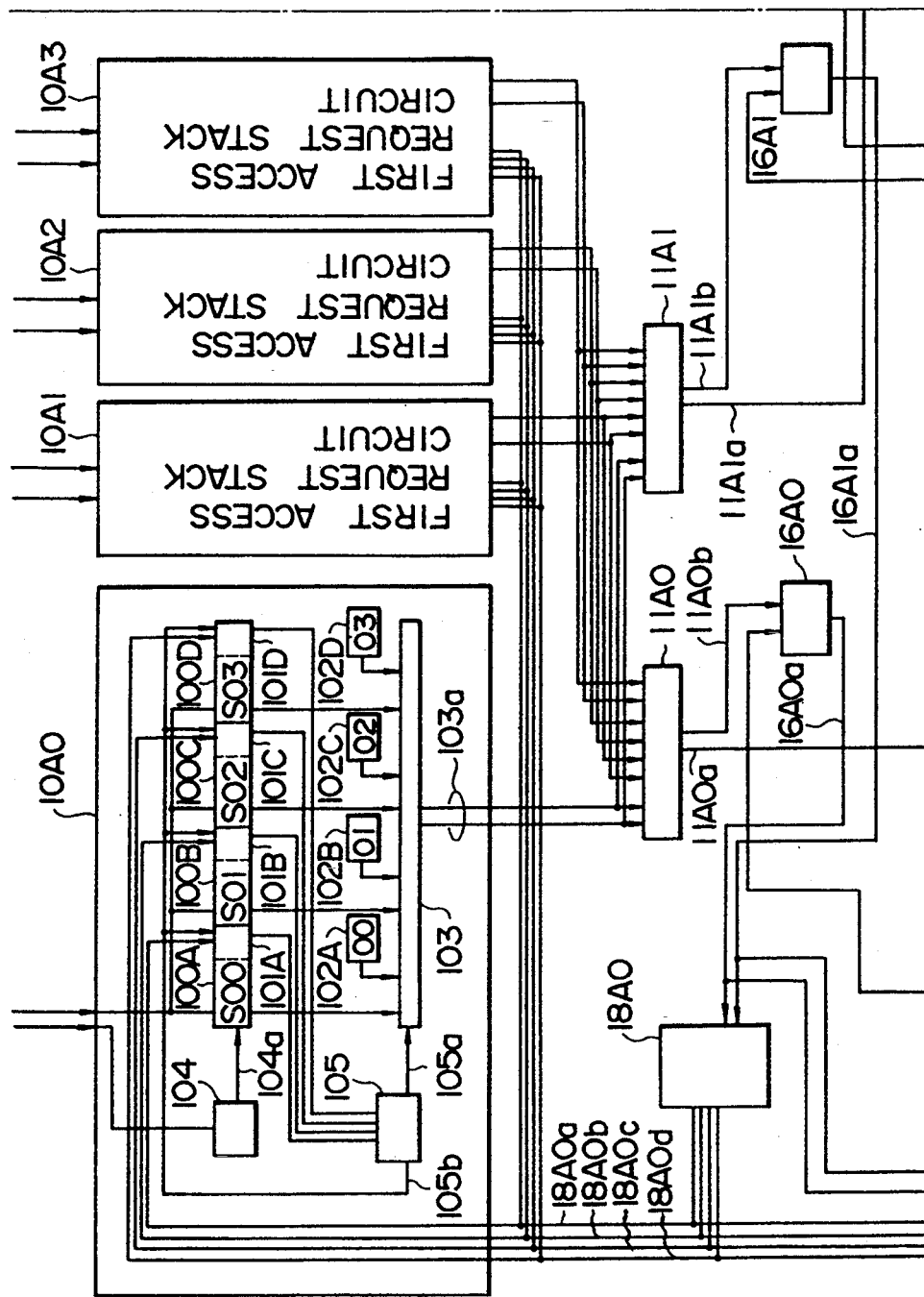

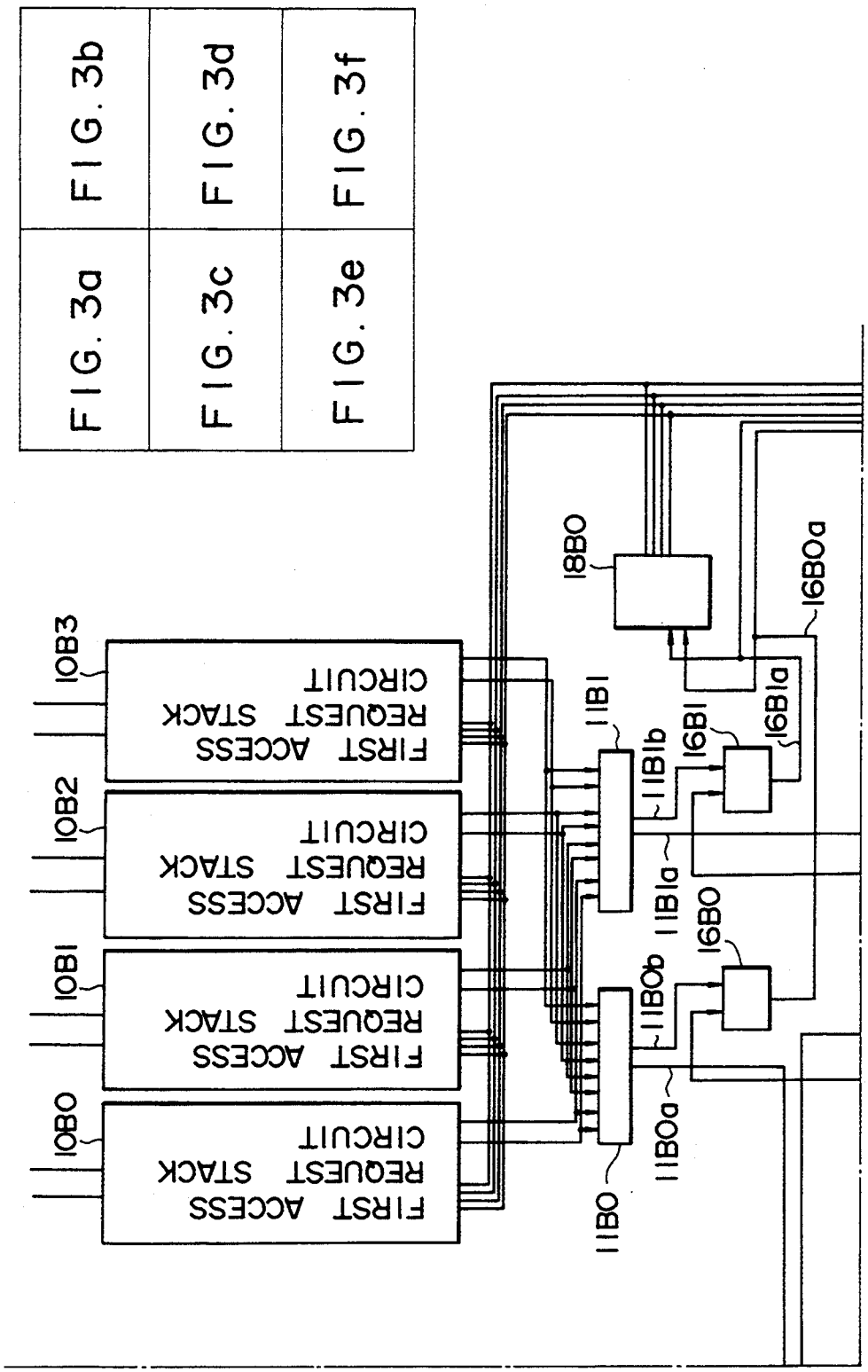

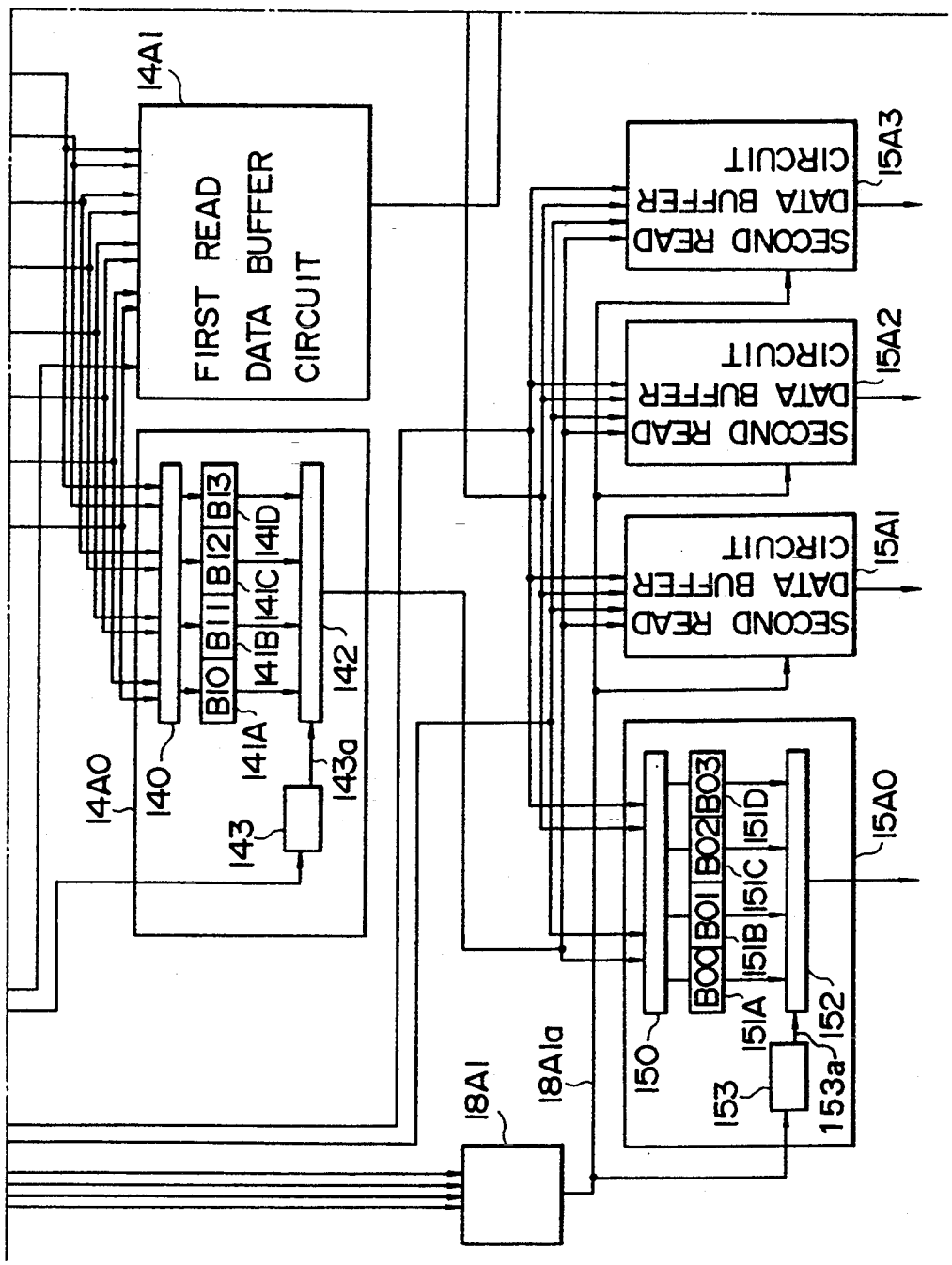

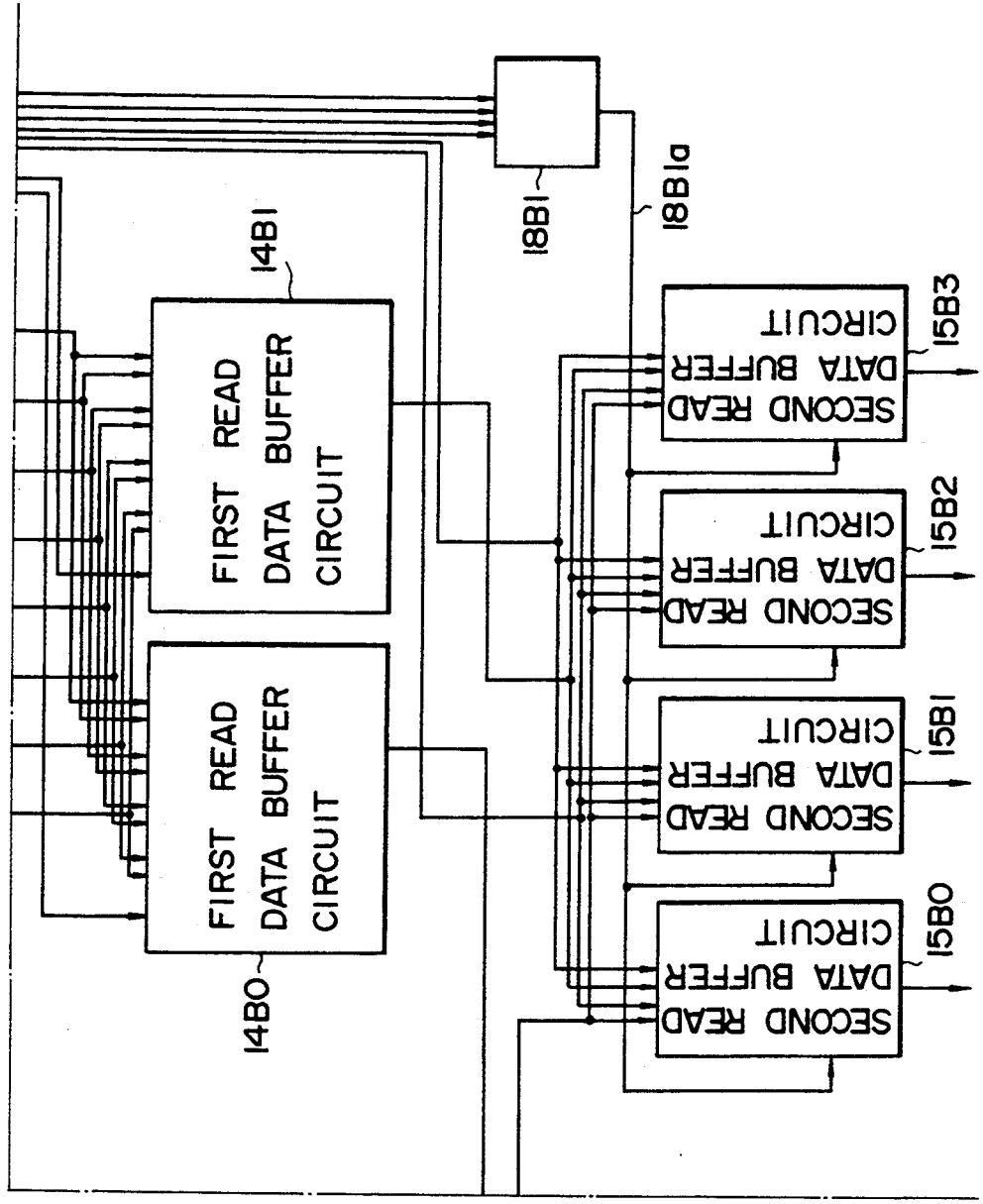

F I G. 7
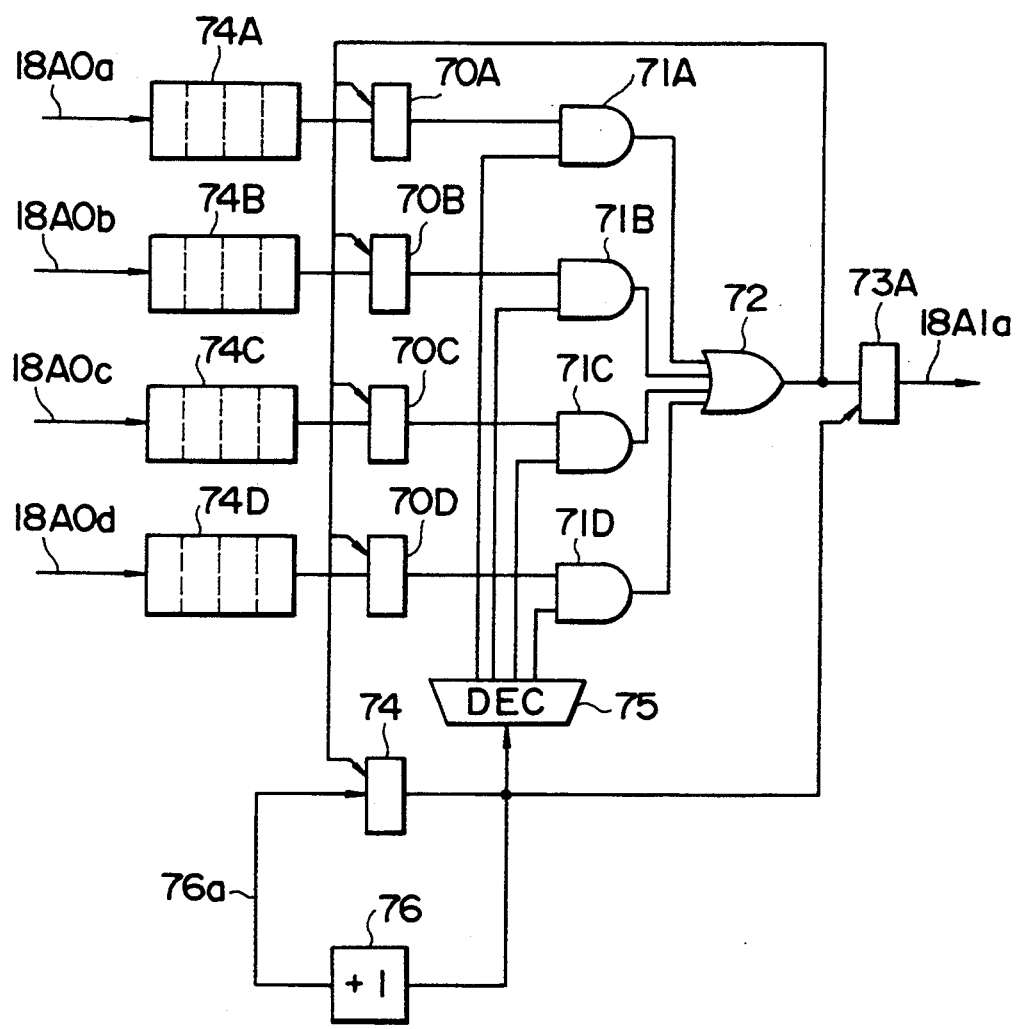

FIG. 8

| FIG. 8a |
|---------|
| FIG. 8b |

FIG. 8a

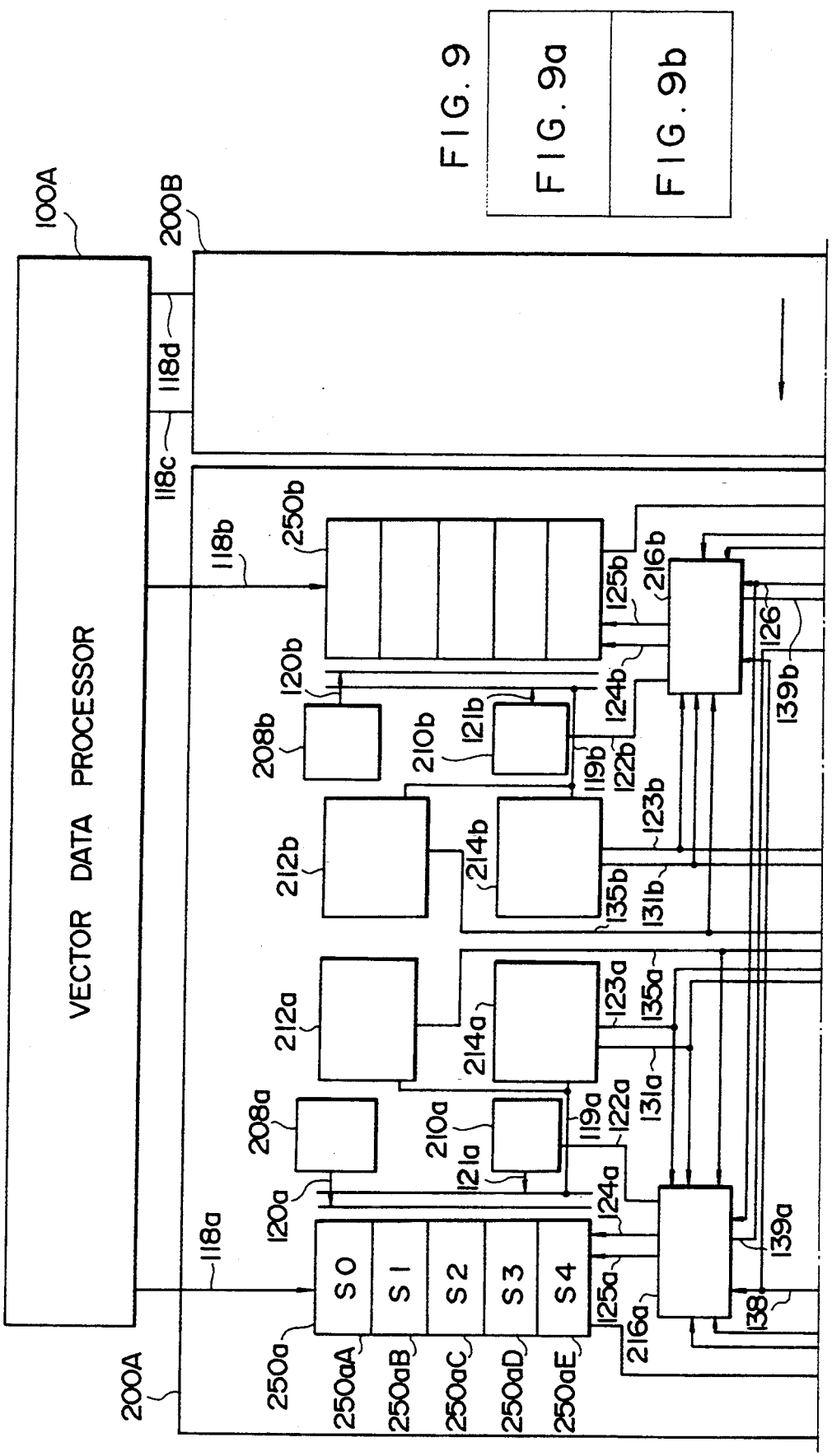

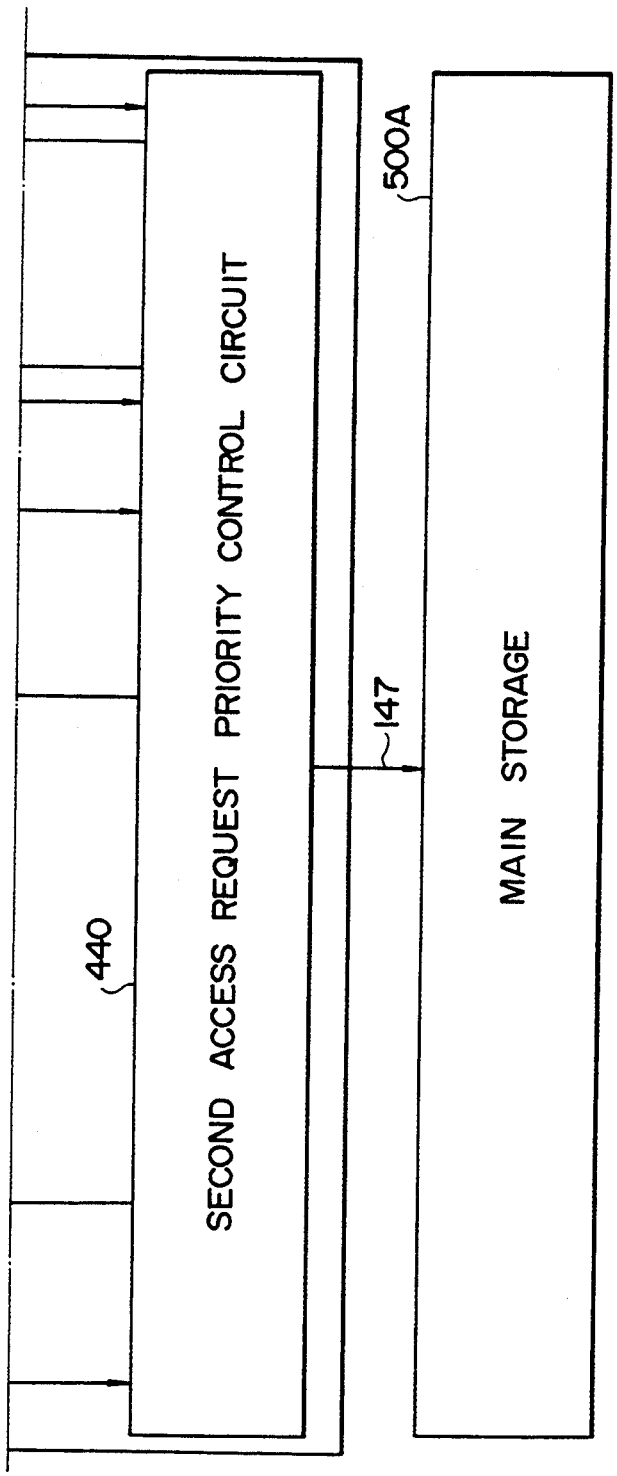
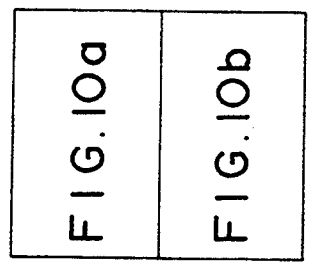

FIG. 11
A. (ISSUED IN VECTOR DATA PROCESSOR 100)
```
V : 1     VALID
    0     INVALID
CODE : 00  ORDINARY ACCESS REQUEST
       01  ORDER-ASSURING A.R.
       10  FIRST SYNCHRONOUS ELEMENT
       11  LAST ORDER-ASSURING A.R.
```
B. (ISSUED IN FIRST PRIORITY CONTROL CIRCUIT 200)
```
V : 1      VALID
    0      INVALID
CODE : 000  ORDINARY ACCESS REQUEST
       001  ORDER-ASSURING A.R.
       010  SECOND SYNCHRONOUS ELEMENT
       011  ORDER-ASSURING REQUEST
       101  LAST ORDER-ASSURING ELEMENT
```

STORE CONTROL METHOD WITH HIERARCHIC PRIORITY SCHEME FOR COMPUTER SYSTEM

BACKGROUND OF THE INVENTION

The present invention relates to a store control method for a computer system and, more particularly, to a store control method for deciding the priority of access requests in plural states, while assuring the order of the plural access requests to he issued from each access request control circuit in a plurality of access request controllers.

Heretofore, for instance, Japanese Patent Laid-open (Kokai) Publication No. 60-136,849 has disclosed a store control method of a computer system, in which plural access request controllers issue access requests to a storage comprised of plural store banks each store bank being an independently accessible store unit, by adding access request identification data to the access requests. This allows read data to return to the access request controller in the order of issuance of the access requests by continuously issuing access requests in proportion to the kinds of access request identification data without particularly determining if priority is established to the preceding plural access requests, and by judging the access request identification data added to the access requests even if the order of access requests would he changed during processing.

Further, Japanese Patent Laid-open (Kokai) Publication No. 62-251,956 discloses a store control method for performing the synchronous and parallel processing of the access requests from an access request controller that is capable of returning the synchronous and parallel read data to the access request controller, even if disorder of parallel operation would be caused during the processing of access requests, by detecting a previous decision regarding the priority of all access requests having identical access request identification data and by performing store control so as to return to the access request controller.

U.S. Pat. No. 4,745,545 discloses a store control method that solves contention of access requests at multiple stages in a multiprocessor consisting of a main storage having plural "sections", working as store units, and plural processors.

In such conventional store control methods, the access request identification data to be added to each access request enables a following access request to be issued without regard to whether the preceding access requests have been selected by all access request priority determining circuits. By adding the access request identification data to the access request and performing store control by distinguishing individual access requests from each other, the access request can be issued at any arbitrary timing.

Therefore, for example, as shown by the timing chart of FIG. 2, an access request $b_0$, with access request identification data $i_0$ added thereto subsequent to issuance of the access request $a_0$ having the identical access request identification data $i_0$, can be issued again after the selection of the preceding access request $a_0$ has been returned as a report signal from all access request priority determining circuits and the report signal has been received. Hence, a sufficient number of kinds of preset access request identification data should be prepared in advance. For instance, the access request identification data are to be prepared in number sufficient to issue a large number of the access requests, without interruption, until the next access request $b_0$ is issued and a report signal, indicative of the selection of the access request $a_0$, has been received by all of the access request priority determining circuits. Therefore, in order to effectively accept and process the access request in the store control, a great number of kinds of the access request identification data are required where a number of access request priority determining circuits is provided and set in multiple stages.

In the main storage, however, the access request is stepwise distributed into the target store banks by each of the access request priority determining circuits in accordance with the contents of a main store address. Hence, the store controller which accepts the access request and which performs the store control stores a device number of the access request controller which has issued the access request, reports the result of selection by all of the access request identification data, and transmits the data read from each store bank to the access request controller. Therefore, the store controller must manage the access requests and control data identifying the access requests for processing the store control. However, as the number of kinds of access request identification data becomes larger, the storage and processing required for the control data for the store control increase, thereby reducing the throughput of the store control.

The control data identifying the access request, such as access request identification data and the number for identifying the access request control circuit issuing the access request, do not particularly require all of the control data at each stage of a multiple-stage access request priority determining circuit.

SUMMARY OF THE INVENTION

It is an object of the present invention to provide a store control method for a computer system for efficiently performing store control by adding only necessary control data for identifying an access request to the access request in each stage of a multiple stage determination of the priority of plural access requests, and by reducing the amount of control data to be added to the access request.

It is another object of the present invention to provide a store control method for a computer system for controlling access to the storage by assuring the order of plural access requests issued from each of a plurality of access request control circuits.

It is a further object of the present invention to provide a store control method for a computer system capable of readily assuring the order of the access requests by adding only the necessary identification data to the access request in each stage, and by reducing the amount of data to be added to the access request.

In order to achieve the aforesaid objects, the present invention consists of a store control method for a computer system having a storage composed of plural independently accessible store banks. A plurality of access request controllers issue an access request to the storage, and a store controller transmits the access request issued by the access request controllers to each of the store banks.

The store controller comprises an access request priority determining circuit (priority circuit) of plural stages for selecting access requests in the order of priority for each of the plural store banks, and the priority circuit determines in multiple stages a priority of the access requests issued from the access request controllers.

The store controller further comprises an access request identification data buffer (ID buffer) in correspondence with the priority circuit, which stores data for identifying the access request consisting of the access request identification data and the device number of the device issuing the access request, i.e. a sender of the access request. The store controller then transmits data read from each store bank by assuring the order of access requests on the basis of the identifying data stored in the ID buffer. In other words, the store controller has the priority circuit for, selecting the access requests in the order of priority for each store bank, and determines in multiple stages the priority of the access requests issued by the access request controllers.

Further, the store controller is provided with the ID buffer in correspondence with the priority circuit, and an ID buffer storing the data for identifying the access request, consisting of the access request identification data to be added to the access request transmitted to the priority circuit as well as the device number of the sender of the access request. By using the data for identifying the access request stored in the ID buffer, the data read from each store bank are transmitted to the device issuing the access request by assuring the order of access requests.

In this instance, the access request identification data are added to the access request for the priority circuit of each stage, and the access request identification data and the device number of the device issuing the access request are stored in the ID buffer corresponding to the priority circuit of each stage. The data read by processing the access request determine the order of the access request of each stage on the basis of the access request identification data stored in the ID buffer of each stage, and the data are transmitted to the device issuing the access request of each stage on the basis of the device number of the device issuing the access request.

With this arrangement, the data are efficiently read from the storage in correspondence with each access request while assuring the order of the access requests. Further, the priority of the access requests is determined in multiple stages, thereby allowing processing at high speed and with high efficiency.

The order of priority of the access requests is determined in each stage of the priority circuit. The data read in processing the access request determine the order of the access requests on the basis of the access request identification data stored in the ID buffer of each stage, and the data are transmitted to the device issuing the access request of each stage on the basis of the device number of the device issuing the access request. Hence, there is provided a read data buffer circuit for each stage, for buffering the read data in correspondence with the priority circuit of each stage, and the read data buffer circuit of each stage has plural read data buffers disposed so as to correspond to the access request identification data of each stage. The data read from each of the store banks are rearranged in each stage on the basis of the data for identifying the access request stored in the corresponding ID buffer of each stage, and stored in the data buffer temporarily before being transmitted to the device issuing the access request on the basis of the device number of the device issuing the access request in accordance with the order of the access requests of each stage.

Synchronous control of the access request control circuit is performed only over the processing of the access request of the first stage, while the access requests of second and subsequent stages are controlled independently from each other, thereby allowing the priority circuits of each intermediate stage to process the access requests at high speed with neither synchronous nor parallel operation.

In implementing the store control by determining the priority of the access requests in multiple stages, the access requests issued from each of the access request control circuits are grouped in the order of issuance of the plural access requests, and transmitted to the priority circuit after the access request identification data have been added to each of the access requests. In this case, when the priority of the access requests is determined in multiple stages, it takes a long time until the report is received for the access request, to which the first access request identification data of the first stage have been added, to be selected by the priority circuit of the final stage. Hence, the more stages of priority circuits, the more kinds of access request identification data are required to be added in the first stage.

As the number of kinds of access request identification data to be added for the first access request gets larger, the addition of such a large number of kinds of access request identification data may be an obstacle to the operation of processing the access requests. Hence, in accordance with the present invention, the access request identification data are added to the access request in the priority circuits of each stage, and the priority circuit of a subsequent stage is made irrelevant to the priority circuit of a preceding stage, thereby minimizing the kinds of priority circuits of the subsequent stage.

It is to be noted, however, that when the order of the access requests is to be controlled only by the access request identification data of the first stage, it is not required to keep the order of transmitting the access requests in the priority circuits of second and subsequent stages, thereby allowing the access requests to be processed at high speed in arbitrary order. However, when an access request transmitted from the priority circuit of a certain stage is selected simultaneously by the priority circuit of the following stage, contention occurs between transfer paths of read data.

On the other hand, the order of the access requests for each stage is assured in each stage by adding the access request identification data to the access request in the priority circuit of each stage, and the store control is performed using these control data for identifying the access request by storing the control data required at each stage in the ID buffer for each stage.

As described hereinabove, only the access request identification data required for each stage of the priority circuits of multiple stages are added to the access request, thereby reducing the data to be added to the access request, and consequently performing the store control with high efficiency.

BRIEF DESCRIPTION OF THE DRAWINGS

FIG. 2 is a time chart showing the timing for processing when the access request can be processed using the access request identification data.

FIG. 3, comprising FIGS. 3a, 3b, 3c, 3d, 3e and 3f, is a circuit block diagram showing the structure of the store controller containing a system for processing control by the access request identification data.

FIG. 7 is a block diagram showing details of the circuit structure of a circuit for transmitting read data.

FIGS. 8 to 17 are directed to another embodiment of the store control method for a computer system according to the present invention; in which:

FIGS. 8, 8a and 8b are block diagrams showing a configuration of the computer system according to the present invention;

FIGS. 9, 9a and 9b are block diagrams showing an example of the configuration of a first priority control circuit;

FIGS. 10a and 10b are block diagrams showing the configuration of an access request holding circuit and a second priority control circuit as shown in FIG. 8;

FIG. 11 is a diagrammatic representation showing the configuration of instruction;

FIG. 12 is a circuit diagram showing the configuration of the sending control circuit in the first priority control circuit;

FIG. 13 is a circuit diagram showing the configuration of a first synchronous element control circuit;

FIG. 14 is a circuit diagram showing the configuration of an order-assuring access request control circuit;

FIGS. 15 and 16 are circuit diagrams showing the configurations of sending control circuits in a second priority control circuit; and FIG. 17 is a circuit diagram showing the configuration of a second synchronous element control circuit.

DETAILED DESCRIPTION OF THE PREFERRED EMBODIMENTS

Figure 1:
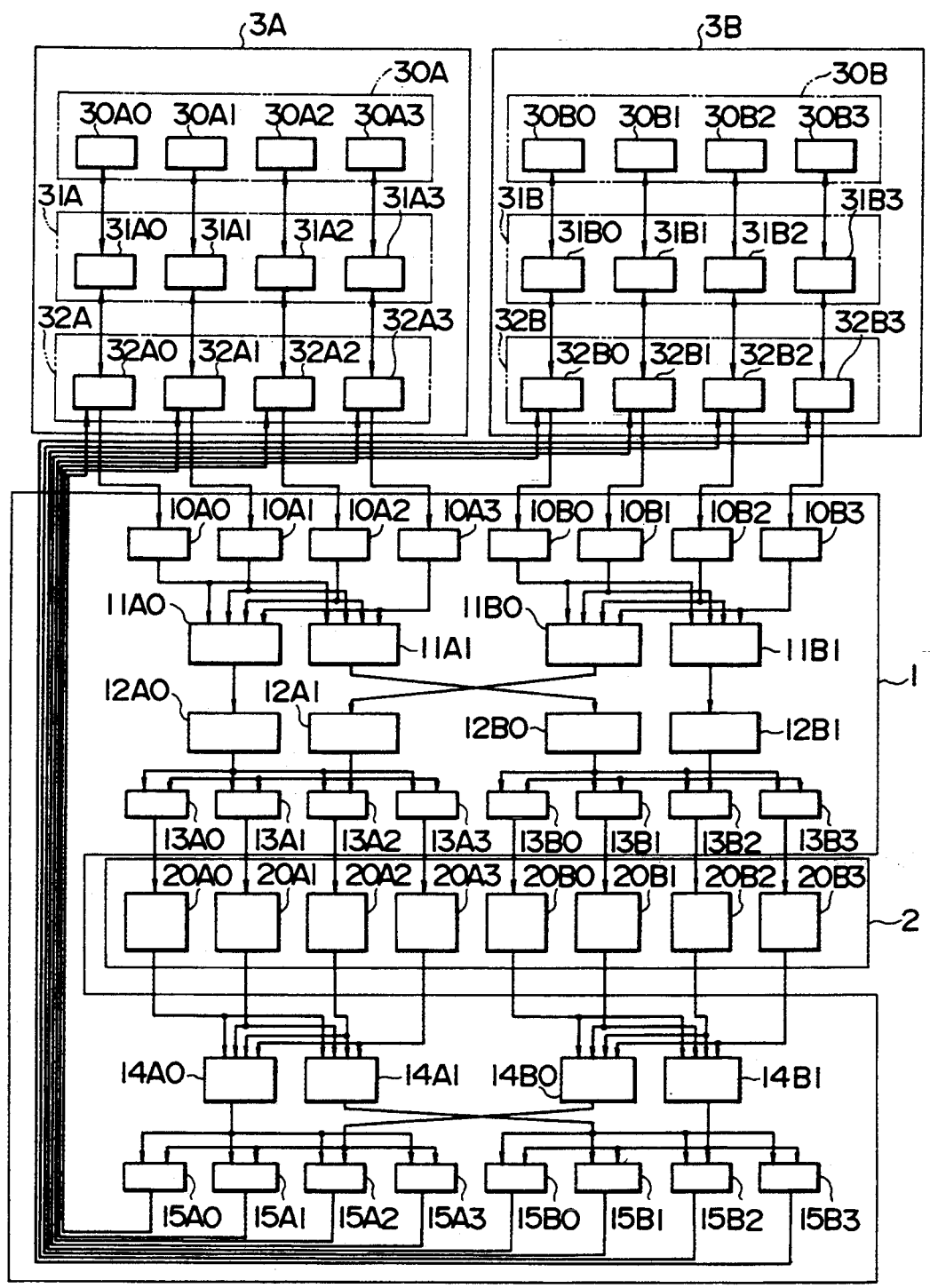
FIG. 1 is a block diagram showing the structure of an essential portion of the computer system according to an embodiment of the present invention.

FIG. 1 is a block diagram showing the configuration of an essential portion of the computer system according to an embodiment of the present invention. The computer system as shown in FIG. 1 is composed of a path for eight data processing systems. In the configuration of the computer system, four of the data processing systems performing simultaneous and parallel processing constitute a group, and the priority is determined among four access requests constituting one group for store control.

Referring to FIG. 1, reference numeral 1 stands for a store controller, reference numeral 2 for a storage, and reference numerals 3A and 3B for data processors. The data processor 3A comprises an arithmetic unit 30A, a vector register unit 31A, and an access request controller 32A, and the data processor 3B comprises an arithmetic unit 30B, a vector register unit 31B, and an access request controller 32B.

The storage 2 comprises a plurality of independently accessible store banks 20A0, 20A1, 20A2, 20A3, 20B0, 20B1, 20B2 and 20B3, and the store controller 1 for implementing the store control for the storage 2 accepts plural access requests generated by and sent from each of the access request controller 32A for the data processor 3A and the access request controller 32B for the data processor 32B, and controls the priority of the order of transmission of the access requests, followed by transmitting the access requests to each of the store banks 20A0, 20A1, 20A2, 20A3, 20B0, 20B1, 20B2 and 20B3 of the corresponding storage 2. Each of these store banks is so disposed as to be independently accessible and to accept an access request, read data stored, and write the data for storing.

The data processor 3A has four data processing systems, each having an arithmetic unit 30A, a vector register unit 31A and an access request controller 32A. Likewise, the data processor 3B has four data processing systems, each having an arithmetic unit 30B, an vector register 31B and an access request controller 32B. Each of these data processing systems issues an access request to the store controller 1, and the store controller 1 accepts the issued access request, thereby controlling the order of transmission of the access requests to each of the store banks of the storage 2 and transmitting the access requests. Then, the access processing for writing or reading the data is implemented in the storage 2.

In other words, a total of eight data processing systems comprising four data processing systems of the data processor 3A and four data processing systems of the data processor 3B comprise eight arithmetic circuits 30A0, 30A1, 30A2, 30A3, 30B0, 30B1, 30B2 and 30B3, eight vector register circuits 31A0, 31A1, 31A2, 31A3, 31B0, 31B1, 31B2 and 31B3, each functioning as a data buffer in one of the arithmetic units 30A and 30B, and eight access request control circuits 32A0, 32A1, 32A2, 32A3, 32B0, 32B1, 32B2 and 32B3.

As described hereinabove, the storage 2 comprises plural store banks 20A0, 20A1, 20A2, 20A3, 20B0, 20B1, 20B2 and 20B3 (eight in this embodiment) which are independently accessible. Access to a particular store bank is determined as a result of decoding address data accompanied with the access request. This determination is made by allowing the store controller 1 to decode the address data accompanied with the access request in two stages, thereby transmitting the resulting access request to the corresponding target store bank.

To this end, the store controller 1 is provided with access request stack circuits of first stage (first stack circuits) 10A0, 10A1, 10A2, 10A3, 10B0, 10B1, 10B2 and 10B3, corresponding respectively to the access request control circuits 32A0, 32A1, 32A2, 32A3, 32B0, 32B1, 32B2 and 32B3, each of which issues an access request. Further, the store controller 1 is provided with access request priority determining circuits of first stage (first priority circuits) 11A0, 11A1, 11B0 and 11B1, corresponding to a group of store banks of the storage 2 (in this embodiment, four store banks constitute one group, and a group of store banks is referred to as a store section) and, furthermore, with access request stack circuits of second stage (second stack circuits) 12A0, 12A1, 12B0 and 12B1, corresponding respectively to the four first priority circuits 11A0, 11A1, 11B0 and 11B1.

There are further provided second stage access request priority determining circuits (second priority circuits) 13A0, 13A1, 13A2, 13A3, 13B0, 13B1, 13B2 and 13B3 for finally transmitting the access request to each of the store banks, which correspond respectively to the store banks 20A0, 20A1, 20A2, 20A3, 20B0, 20B1, 20B2 and 20B3.

The first stage read data buffer circuits (first buffer circuits) 14A0, 14A1, 14B0 and 14B1 for temporarily storing the data read from each of the store banks are provided in correspondence with each of the store sections, and the second stage read data buffer circuits (second buffer circuits) 15A0, 15A1, 15A2, 15A3, 15B0, 15B1, 15B2 and 15B3 following the first buffer circuits are provided in correspondence therewith.

Each of the data processing systems of the computer system having the aforesaid configuration implements its own processing and the computer system is operated as two data processors having four elements disposed parallel to each other.

Description of the operation will be made by taking a series of operations, including reading the data from the storage, and then processing and reading the data into the storage as an example. The two data processors comprise the first data processor 3A (hereinafter referred to as the processor A) and the second data processor 3B (hereinafter referred to as the processor B). Each of the data processing systems for each of the processors A and B serves as a data processing element, and every four elements are operated simultaneously by the element parallel processing system.

The operation of the processor A, the storage 2 and the store controller 1 will mainly be described. First, description will be made of the operation of reading vector data from the storage 2 and storing it in the vector register unit 31A. Each vector element is assigned to the access request control circuits 32A0, 32A1, 32A2 and 32A3 as follows:

32A0: 0, 4, 8, ..., $4n^{th}$ element

32A1: 1, 5, 9, ..., $(4n+1)^{th}$ element

32A2: 2, 6, 10, ..., $(4n+2)^{th}$ element

32A3: 3, 7, 11, ..., $(4n+3)^{th}$ element (where n is 0 or a positive integer)

As has been described hereinabove, the access request is simultaneously formed from each of the assigned vector elements, and the access requests formed simultaneously from each of the access request control circuits 32A0, 32A1, 32A2 and 32A3 corresponding to each of the elements are transmitted simultaneously to the corresponding first stack circuits 10A0, 10A1, 10A2 and 10A3. The first stack circuits 10A0, 10A1, 10A2 and 10A3 transmit the access requests to the first priority circuits 11A0 and 11A1 corresponding to the store section containing the target store bank on the basis of the address of the access request. The first priority circuits 11A0 and 11A1 select one access request in accordance with a predetermined order of priority when the plural access requests compete with each other, and transmit the access request to the second stack circuit 12A0 or 12B0 corresponding thereto. Likewise, the second stack circuits 12A0 and 12B0 transmit the access requests to the second priority circuits 13A0, 13A1, 13A2 and 13A3 or 13B0, 13B1, 13B2 and 13B3 corresponding to the target store bank on the basis of the address of the access request.

The second priority circuits 13A0, 13A1, 13A2, 13A3, 13B0, 13B1, 13B2 and 13B3 select one access request in accordance with the predetermined order of priority, when the access requests transmitted from the two processors consisting of the processor A and the processor B compete with each other, and transmit the access, requests to the store banks 20A0, 20A1, 20A2, 20A3, 20B1, 20B2 and 20B3 corresponding to the address of the access request. On the other hand, each of the store banks 20A0, 20A1, 20A2, 20A3, 20B0, 20B1, 20B2 and 20B3 reads the corresponding data stored in the address of the transmitted access request and returns the read data to the store controller 1 after a predetermined fixed period of time (corresponding to an access time). This allows the store controller 1 to set the read data to the first buffer circuit 14A0 or 14B0 corresponding to the store bank of the processor A or the store bank of the processor B.

Thereafter, the read data are transmitted by one element from the first buffer circuit 14A0 or 14B0 and set to the second buffer circuits 15A0-15A3 15B0-15B3 corresponding to each of the access request control circuits 32A0, 32A1, 32A2 and 32A3, 32B0-32B3. The data read therein are returned to each of the access request control circuits 32A0, 32A1, 32A2 and 32A3, 32B0-32B3 in the order of issuance of the access requests at the time when all data of the four access requests issued simultaneously by the access request control circuits 32A0, 32A1, 32A2 and 32A3 have been read out, and the read data are simultaneously stored in each of the vector register circuits 31A0, 31A1, 31A2 and 31A3.

The assignment relationship between each of the vector register units and the elements is shown as follows.

Vector registers

31A0: 0, 4, 8, ..., $4n^{th}$ element

31A1: 1, 5, 9, ..., $(4n+1)^{th}$ element

31A2: 2, 6, 10, ..., $(4n+2)^{th}$ element

31A3: 3, 7, 11, ..., $(4n+3)^{th}$ element (where n is 0 or a positive integer)

In processing the data stored in the vector register 31A0, 31A1, 31A2 and 31A3, each of the vector elements is first assigned to an arithmetic unit 30A0, 30A1, 30A2 or 30A3 in the manner as will be described hereinafter and the operation results are stored in the vector register again.

Arithmetic unit assignments are as follows:

30A0: 0, 4, 8, ..., $4n^{th}$ element

30A1: 1, 5, 9, ..., $(4n+1)^{th}$ element

30A2: 2, 6, 10, ..., $(4n+2)^{th}$ element

30A3: 3, 7, 11, ..., $(4n+3)^{th}$ element (where n is 0 or a positive integer)

For instance, in the arithmetic unit 30A, the operation is performed by thoroughly synchronizing four arithmetic units 30A0, 30A1, 30A2 and 30A3 with each other, and each of the operation results of the 0th, 1st, 2nd and 3rd elements assigned to each of the arithmetic units is given at the same time and stored in each of the vector register circuits 31A0, 31A1, 31A2 and 31A3 at the same time.

Finally, when the data stored in each of the vector register circuits 31A0, 31A1, 31A2 and 31A3 are written in the storage 2, each element is assigned to an access request control circuit 32A0, 32A1, 32A2 or 32A3, in the same manner as for reading the described data, and the four access requests are transmitted to the corresponding first stack circuits 10A0, 10A1, 10A2 and 10A3. The processing which follows is performed up to transmission of the access request to the storage 2 in the same manner as for the reading processing as described hereinabove.

The foregoing description is an outline of the operation for accessing the using processor A. The store control for storing access requests is similarly performed by the processor B.

In the store control of storing access requests in the manner as described hereinabove, the access request to be issued by the access request controller can be issued without being conscious of whether all of the preceding access requests have been selected by the access request priority control circuit. Further, for parallel processing, the synchronous control is performed over a time lag in processing the access requests, which may be due to a state of the store bank to which access is made (for example, a state in which the store bank is being used by the preceding access request or a state in which the access request competes with other access requests). Therefore, the store control is performed by adding the data access request identification data to the access request and using the access request identification data added thereto. In this case, the access request identification data are added in each of the priority circuits of each stage. Further, the priority of the access requests is determined in multiple stages in each of the priority circuits of each stage, thereby performing the store control by using the access request identification data to be added at each stage.

Specific description will now be made of a store control processing operation performed by the computer system using the access request identification data with reference to a detailed circuit configuration of the store controller.

Figure 3C:
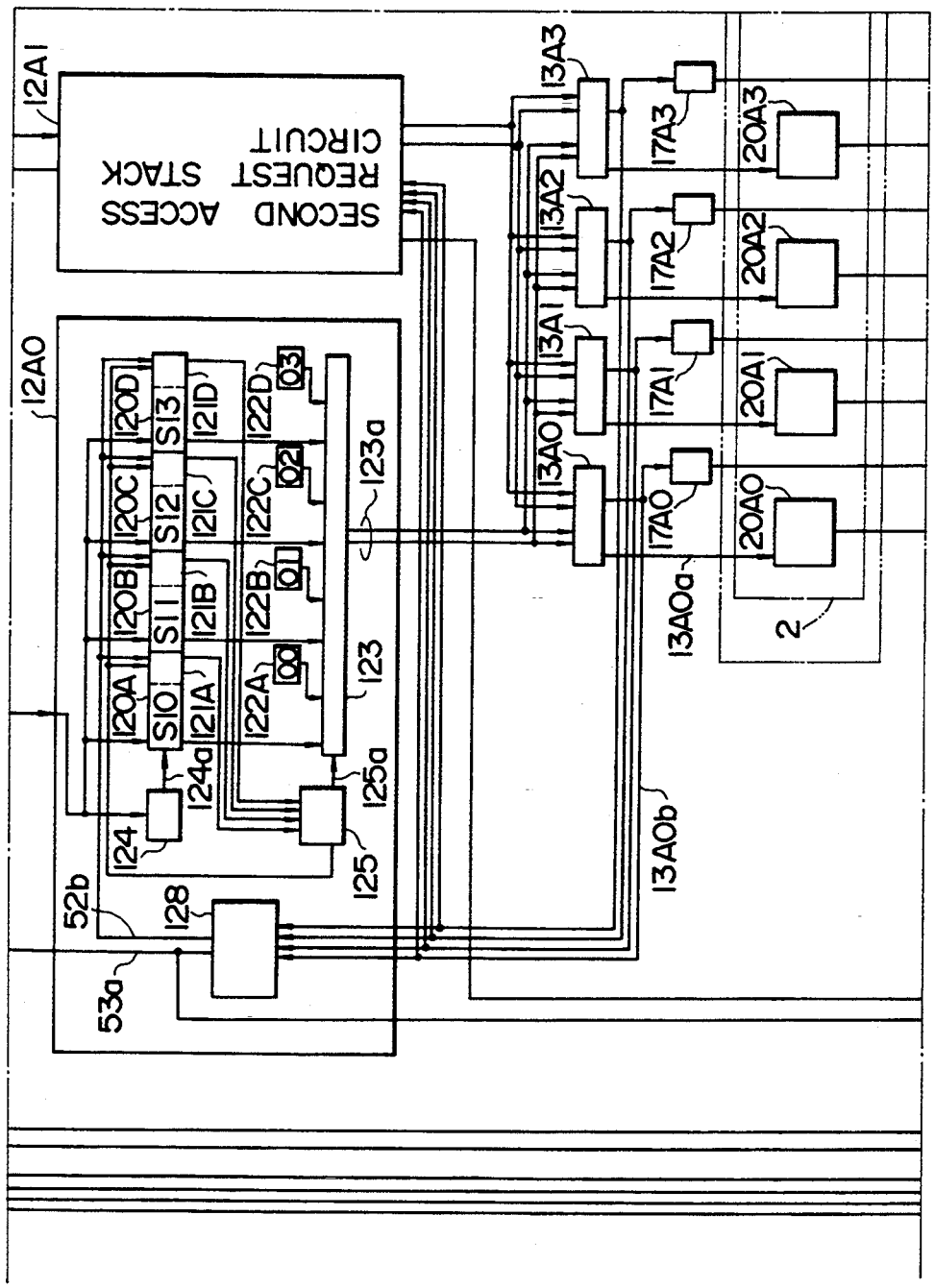
Figure 3D:
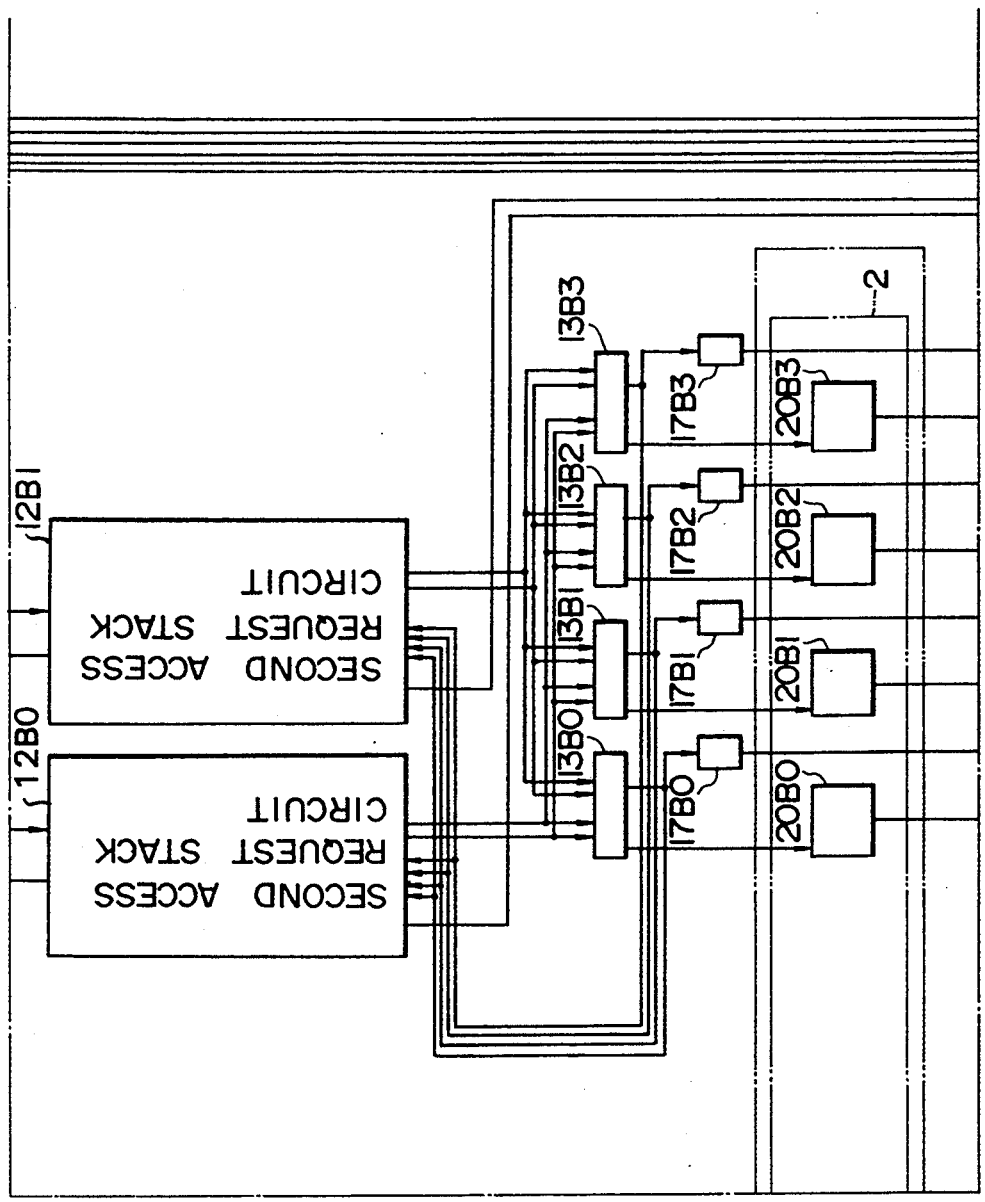

FIG. 3, comprising FIGS. 3a, 3b, 3c, 3d, 3e and 3f, is a circuit block diagram showing the configuration of the store control containing a control processing system for using the access request identification data.

The circuit block diagram as shown in FIG. 3 is a detailed circuit configuration of the store controller, which comprises the storage 2 having the store banks 20A0, 20A1, 20A2, 20A3, 20B0, 20B1, 20B2 and 20B3. As shown in FIG. 3, the store controller basically comprises first stack circuits 10A0, 10A1, 10A2, 10A3, 10B0, 10B1, 10B2 and 10B3, first priority circuits 11A0, 11A1, 11B0 and 11B1, second stack circuits 12A0, 12A1, 12B0 and 12B1, second priority circuits 13A0, 13A1, 13A2, 13A3, 13B0, 13B1, 13B2 and 13B3, first buffers 14A0, 14A1, 14B0 and 14B1, and second buffers 15A0, 15A1, 15A2, 15A3, 15B0, 15B1, 15B2 and 15B3.

The store controller determines the order of priority of the access requests in each stage of the priority circuits by using the access request identification data. To this end, the circuit of the store controller for determining the priority string of the access request comprises first access request identification data buffers (first ID buffers) 16A0, 16A1, 16B0 and 16B1, second access request identification data buffers (second ID buffers) 17A0, 17A1, 17A2, 17A3, 17B0, 17B1, 17B2 and 17B3, first access request identification data control circuits (first ID control circuits) 18A0 and 18B0, and first read data sending control circuits (first sending circuits) 18A1 and 18B1.

Description will next be made of the operation by taking access from the processor A to the storage 2 as an example.

First, four access requests (for example, access requests corresponding to the 0th element, 1st element, 2nd element and 3rd element) issued simultaneously from the access request control circuits 32A0, 32A1, 32A2 and 32A3 (FIG. 1) reach the first stack circuits 10A0, 10A1, 10A2 and 10A3, respectively. The access request corresponding to the 0th element which has reached the first stack circuit 10A0 is set to either of a first stack (S00) 100A, second stack (S01) 100B, third stack (S02) 100C or fourth stack (S03) 100D, designated by the input control circuit 104. For instance, the access request corresponding to the 0th element is set in the first stack (S00) 100A by designation by the input control circuit 104 through a signal line 104a. The input control circuit 104 is a circuit for designating each of the stack positions "0", "1", "2" and "3" (corresponding to the 1st stack S00, 2nd stack S01, 3rd stack S02 and 4th stack S03) for storing the access requests. The control circuit 104 designates the stack position in which the next access request is staggered in order through the signal line 104a whenever the access request accepted is stored in the stack in the designated position. The data designating the stack position are transmitted by staggering the sequence of stack positions as indicated as follows: "0"→"1"→"2"→"3"→"0"→ . . .

On the other hand, the access requests stored in the stacks S00 to S03 are transmitted to the first priority circuit 11A0 or 11A1 through a selection circuit 103 from the stack in the position designated by an output control circuit 105, for example, from the first stack (S00) 100A. The output control circuit 105 designates the stack position "0", "1", "2" or "3", from which the access request is fetched, through a signal line 105a in the same operation as the input control circuit 104. In other words, the output control circuit 105 moves the stack positions in order and changes the stack positions, as indicated by "0"→"1"→"2"→"3"→"0"→ . . . , whenever the access requests are generated one after another. Further, the output control circuit 105 sends to the selection circuit 103 the value selected from the stack positions in which the access requests to be generated in response to the signal line 105a are stored. It is noted herein that the output control circuit 105 controls the generation of the access requests stored in each stack on the basis of the value indicative of the contents of flip-flops 101A, 101B, 101C and 101D for controlling the transmission of the access requests, corresponding to each of stacks S00, S01, S02 and S03, unlike the control by the input control circuit 104.

In other words, the output control circuit 105 causes the access request stored in the stack S00 to be sent to the first priority circuit 11A0 or 11A1, when the flip-flop 101A for controlling the transmission of the access request to the stack in which the access request to be fetched is stored, i.e. to the first stack (S00) 100A, is "1". When the flip-flop circuit 101A for controlling the transmission of the access request is "0", the access request is suppressed from sending from the first stack (S00) 100A until the flip-flop circuit 101A for controlling the transmission of the access request is set to "1" by a signal line 18A0a from the ID control circuit 18A0. At the same time, control of the output control circuit 105 is accomplished so as to retain the stack position at "0", in order to suppress renewal of the signal to be sent from the signal line 105a. In other words, the control is performed so as to send the next access request after the processing of the preceding access request has been finished.

Immediately after the access request has been fetched from the corresponding first stack (S00) 100A and sent to the first priority circuit 11A0 or 11A1 when the flip-flop 101A is "1", the value of the flip-flop 101A is reset to "0" in response to a control signal generated from the output control circuit 104 through the signal line 105b and report data (signal line 18A0a) reporting on the transmission of the access request, in a manner as will be described hereinafter. This processing allows the stack position, in which the access request to be fetched by the output control circuit 105 for the next time is stored, to advance to the position of the next stack S01 (100B).

In this case, the access request is sent through the signal line 103a from the selection circuit 103 to the first priority circuit 11A0 or 11A1, for example, by adding address data stored in the first stack (S00) 100A as well as control data for identifying the access request (access request identifying data) consisting of a two-digit number (00, 01, 02 and 03). The control data function as first access request identification data (in this embodiment, there is employed, as it is, the number corresponding to the stack number in which the access request is stacked) to be generated and sent by first access request identification data forming circuits (first ID forming circuits) 102A, 102B, 102C and 102D, and the device number "0" corresponding to the first stack circuit 10A0. For instance, when the access request stored in the first stack (S00) 100A is sent, the control data for identifying the access request consisting of the device number "0" of the first stack circuit 10A0 and the first access request identification data "00" (102A) are added to address data of the storage to which access is made, and this access request is then sent as a request to the first priority circuit 11A0 or 11A1.

As described hereinabove, the first stack circuit 10A0 is operated to send the access request to the first priority circuit 11A0 or 11A1. However, the first stack circuits 10A1, 10A2 and 10A3 are operated in the same manner as the first stack circuit 10A0, thereby storing the access request corresponding to each element issued at the same time by the four access request controllers in each of the identical stack positions of the respective first stack circuits. These access requests are then sent to the first priority circuit 11A0 or 11A1 after the identical first access request identification data have been added, even though the device number is different.

Then, the access request sent from the selection circuit 103 of the first stack circuit. 10A0 through the signal line 103a arrives at the first priority circuit 11A0 or 11A1 corresponding to the store section on the basis of the address data. For instance, the access request (103a) which has arrived at the first priority circuit 11A0 is sent from the other first stack circuits 10A1, 10A2 and 10A3 in the first priority circuit 11A0, in order to determine and select the order of priority among the other access requests arriving there. When the order of priority has been determined and chosen, the access request is sent through the signal line 11A0a to the second stack circuit 12A0 corresponding to the respective store section.

When the access request is sent through the signal line 11A0a from the first priority circuit 11A0, the control data for identifying the access request, consisting of the first access request identification data and the device number "0" of the first stack circuit 10A0, are sent at the same time to the first ID buffer 16A0 (its detailed circuit diagram being shown in FIG. 4) through the signal line 11A0b.

Although the details of the first ID buffer 16A0a will be described hereinafter, there are provided plural stacks for storing the control data for identifying the access request consisting of the first access request identification data and the device number "0" of the stack circuit. The stacked control data for identifying the access request are then sent to the ID control circuit 18A0 through the signal line 16A0a on the basis of the report data reporting on the selection of the corresponding access request. The signal sent through the signal line 16A0a also functions as a report signal reporting on the finish of the processing for selecting the access request.

The access request whose priority has been determined and selected by the first priority circuit 11A0 arrives at the second stack circuit 12A0 through the signal line 11A0a. The access request is then set in the second stack circuit 12A0 to one of a first stack (S10) 120A, second stack (S11) 120B, third stack (S12) 120C, and fourth stack (S13) 120D designated through a signal line 124a by an input control circuit 124. For instance, the access request arriving there is set to the first stack (S10) 120A by the designation through the signal line 124a from the input control circuit 124. The input control circuit 124 staggers values of the stack positions in which the access request is to be stored in order, as indicated by "0"→"1"→"2"→"3"→"0"→ . . . , and sends the data on the values designating the stack positions.

On the other hand, the access requests stored in the stacks S10, S11, S12 and S13 are sent to the second priority circuits 13A0, 13A1, 13A2 and 13A3 through the selection circuit 123 from the stack of the position designated by an output control circuit 125, e.g. stack S10 (120A). Also, the output control circuit 125 sends the data on the values designating the positions of the stacks which vary, as indicated by "0"→"1"→"2"→"3"→"0"→ . . ., by consecutively staggering the values designating the stack positions to be outputted in order to control the selection circuit 123 by having the signal line 125a designate the stack position from which the access request is fetched. Further, the output control circuit 125 controls the output of the access request to be sent from each of the stacks S10, S11, S12 and S13 on the basis of the value of the contents of the flip-flop for controlling the transmission of the access request, as identified by 121A, 121B, 121C and 121D, corresponding to the stacks S10, S11, S12 and S13. The operation for stacking the second stack circuit 12A0 is the same as in the first stack circuit 10A0 as described hereinabove.

The access request to be sent from the selection circuit 123 of the second stack circuit 12A0 through the signal line 123a to the second priority circuits 13A0, 13A1, 13A2 and 13A3 for determining the order of priority of the access requests of second stage is provided with the address data stored, for example, in the stack S10 (120A) and with the control data for identifying the access request. The access request is sent in the same manner as in the first stack circuit 10A0. The control data for identifying the access request consist of the second access request identification data, which correspond to a two-digit number (00, 01, 02 and 02) (in this embodiment, the number being identical to the stack number of the stack in which the access request has been stacked), and the device number "0" of the second stack circuit 12A0, second access request identification data being generated by and sent from a second ID generating circuit 122A, 122B, 122C or 122D.

As described hereinabove, the second stack circuit 12A0 is operated to thereby send the access request to the second priority circuits 13A0, 13A1, 13A2 and 13A3. The second stack circuit 12A1 in the other system is operated in the same manner. It is noted herein that the second stack circuits 12A0 and 12A1 are operated thoroughly independently from each other, unlike the first stack circuits 10A0, 10A1, 10A2 and 10A3.

The access request sent by the signal line 123a from the selection circuit 123 of the second stack circuit 12A0 arrives at the second priority circuits 13A0, 13A1, 13A2 and 13A3 corresponding to the store bank on the basis of the address data for making the storage 2 accessible. For instance, the access request at the second priority circuit 13A0 is determined for its order of priority over the other access requests sent from the second stack circuit 12A1 of the other system after arrival there and the access request is singled out. The chosen access request is then sent through the signal line 13A0 to the corresponding store bank 20A0.

Figure 5:
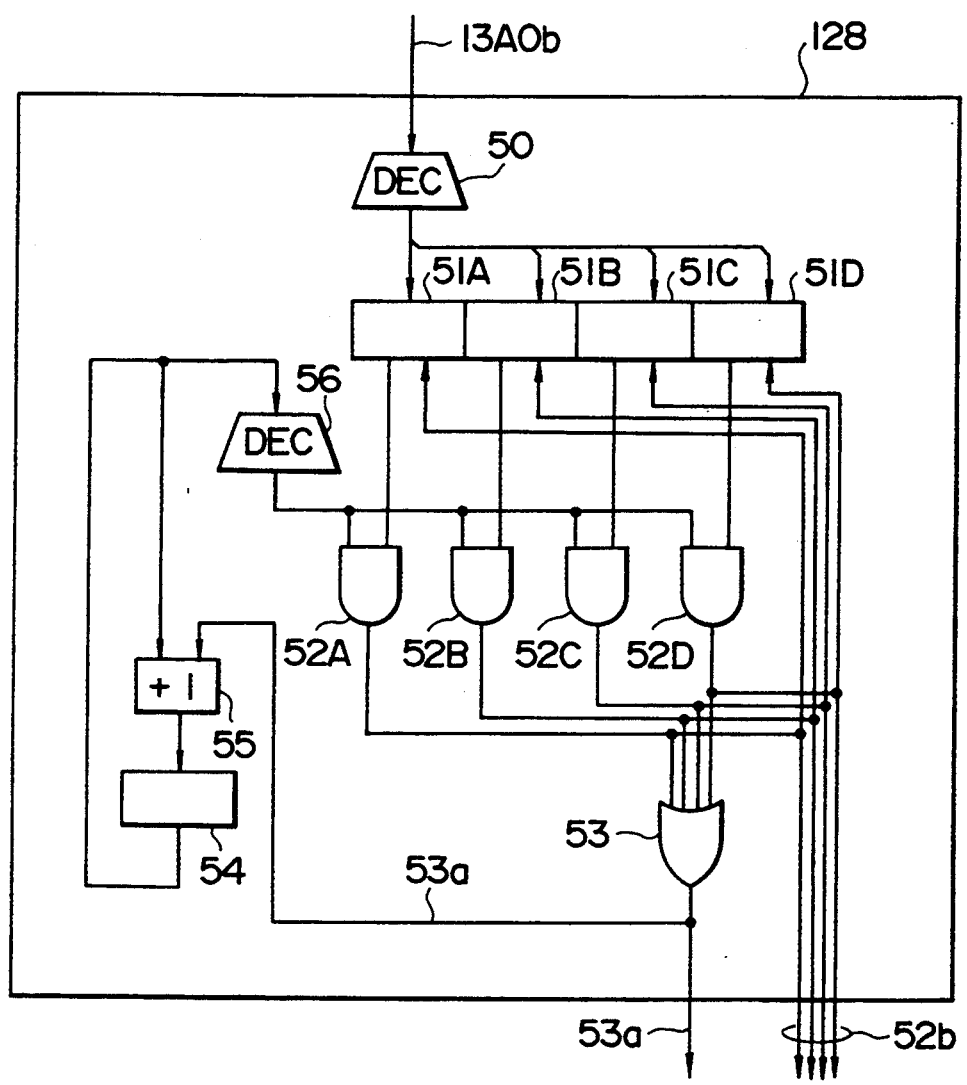
FIG. 5 is a circuit diagram showing details of the circuit structure of a second access request identification data control circuit (second ID control circuit).

When the access request has been sent from the signal line 13A0 to the store bank 20A0 involved, the report is given to the second stack circuit 12A0 as a sender of the access request to the effect that the processing for selecting the order of priority of the access request has been finished. Then, in order to allow the processing for choosing the order of priority of the access request which follows, the second access request identification data corresponding to the chosen access request are simultaneously sent through the signal line 13A0b from the second priority circuit 13A0 to a second ID control circuit 128 (the details of the circuit being as shown in FIG. 5) disposed within the second stack circuit 12A0.

Although it will be described hereinafter, the second ID control circuit 128 comprises a decoder, a flip-flop, a logic gate, and so on. The second ID control circuit 128 performs control of each stack in the second stack circuit 12A0 of the preceding stage, in order to select the order of priority of the subsequent access requests, by determining the access requests which have already been processed for selecting the order of priority on the basis of the second access request identification data corresponding to the access request from the second priority circuits 13A0, 13A1, 13A2 and 13A3. The second ID controlling circuit 128 further sends the report data reporting on the finish of the processing for selecting the priority of the access request involved, in order to further proceed with control of each stack in the first stack circuit 10A0 of the preceding stage.

As described hereinabove, the second ID controlling circuit 128 sends the report data reporting on the finish of the processing for selecting the order of priority of the access request to the first ID buffer 16A0 through a signal line 53a after it has received the report data reporting on the fact that the access request sent from the second stack circuit 12A0 had been selected in the second priority circuits 13A0, 13A1, 13A2 and 13A3. In the first ID buffer 16A0 (FIG. 4), the control data for identifying the access request, consisting of the device number of the first stack circuit in which the access request is stored and the first access request identification data, are read on the basis of the number of the buffer indicated by the internal output control circuit, and the data read are then sent to the first ID controlling circuit 18A0. At this time, the control of the output control circuit in the first ID buffer 16A0 renews the number of the buffer in which the control data for identifying the access request to be read next are stored.

By selecting the access requests by the determination of the order of priority in the second priority circuits 13A0, 13A1, 13A2 and 13A3, the first, ID buffer 16A0 sends the device number of the first stack circuit 12A0 and the first access request identification data for the corresponding access request through the signal line 16A0a to the first ID controlling circuit 18A0.

The first ID controlling circuit 18A0 will be operated in the manner as will be described hereinbelow. The first ID controlling circuit 18A0 (Fog. 6) comprises plural decoders, flip-flops, logic gates, etc. The first ID controlling circuit 18A0 decodes the device numbers of the first stack circuits 10A0, 10A1, 10A2 and 10A3 upon input through the signal line 16A0a of the control data for identifying the access requests which have already been chosen, which consists of the device number of the first stack circuit and the first access request identification data. Further, the first ID controlling circuit 18A0 decodes the stack number from the first access request identification data, sets a flip-flop for significant display of the access request identification data on the basis of a signal identifying the first stack circuit and the stack number and outputs the request through each of the signal lines 18A0a, 18A0b, 18A0c and 18A0d.

Further, the first ID controlling circuit 18A0 likewise decodes the control data for identifying the access request transmitted by a signal line 16A1a through a first ID buffer 16A1 from the second priority circuit 11A1 of the other processing system and sets the request to a flip-flop for significantly displaying the particular access request, thereby generating the request through each of the signal lines 18A0a, 18A0b, 18A0c and 18A0d.

In other words, the first ID controlling circuit 18A0 sets the flip-flop 101a for controlling the transmission of the access request corresponding to the stack S00 in each of the first stack circuits 10A0, 10A1, 10A2 and 10A3 to "1" through the signal line 18A0a when all of the flip-flops for significantly displaying the access request identification data corresponding to the same stack number of each of the first stack circuits 10A0, 10A1, 10A2 and 10A3 have been set to "1" (when all four access requests have been sent to the storage 2, all access requests being set in the positions of the stack S00 as the access requests of each element have arrived at each of the first stack circuits 10A0, 10A1, 10A2 and 10A3).

The subsequent access requests stored in the stack S00 of each of the first stack circuits 10A0, 10A1, 10A2 and 10A3 are brought into a state in which they can be sent to the first priority circuits 11A0 and 11A1, and the flip-flop for significantly displaying the access request identification data corresponding to the signal is reset to "0" when the signal has been sent to the first stack circuits 10A0, 10A1, 10A2 and 10A3 through the signal line 18A0a.

On the other hand, each of the data read from each of the store banks 20A0, 20A1, 20A2, 20A3, 20B0, 20B1, 20B2 and 20B3 for the access requests sent thereto (the access requests to be sent from the second priority circuits 13A0, 13A1, 13A2, 13A3, 13B0, 13B1, 13B2 and 13B3) is sent to each of the first read data buffer circuits 14A0, 14A1, 14B0 and 14B1, together with the control data, after an access time of each of the store banks is aligned with the others on the basis of each of the second ID buffers 17A0, 17A1, 17A2, 17A3, 17B0, 17B1, 172 and 17B3 corresponding to each store bank (corresponding to each of the second priority circuits). In each of the first read data buffer circuits 14A0, 14A1, 14B0 and 14B1, the read data are stored in either of data buffer B10 (141A), B11 (141B), B12 (141C) or B13 (141D) by controlling the selection circuit (140) within the first read data buffer circuits on the basis of the device number of the second stack circuits as a sender of the access request and the second access request identification data. For instance, when the second access request identification data of the access request are "00", the read data are stored in the corresponding data buffer B10 (141A) within the first read data buffer circuit 14A0.

As described hereinabove, the read data stored in the first read data buffer circuits 14A0, 14A1, 14B0 and 14B1 are further sent to the second read data buffer circuits 15A0, 15A1, 15A2, 15A3, 15B0, 15B1, 15B2 and 15B3 by controlling the output control circuit 143 and the selection circuit 142 in the order of arrival of the access requests corresponding to the read data at the second stack circuits 12A0, 12A1, 12B0 and 12B1. For example, when the data are read from the first read data buffer circuit 14A0, the read data are generated through the selection circuit 142 from the data buffer in the position designated by the output control circuit 142 of the first read data buffer circuit 14A0. The output control circuit 143 is a circuit for designating the position of the data buffer for reading the data for the selection circuit 142 through the signal line 143a. Further, the output control circuit 143 sends a signal which varies in order, as indicated by "0"→"1"→"2"→"3"→"0"→... , as a signal for designating the position of the data buffer, by the signal of the signal line 53a from the second ID controlling circuit 128 as described hereinabove. It is to be noted herein that the signal of the signal line 53a from the second ID controlling circuit 128 is sent so as to assure the order of the access requests sent from the second stack circuit 12A0 and 12A1.

The read data are sent from the first read data buffer circuits 14A0, 14A1, 14B0 and 14B1 to the second read data buffer circuits 15A0, 15A1, 15A2, 15A3, 15B0, 15B1, 15B2 and 15B3. In synchronization with the transmission of the read data from the first read data buffer circuits 14A0, 14A1, 14B0 and 14B1, the control data for identifying the access request, consisting of the device number of the first access request stack circuit and the first access request identification data for the read data sent through the signal lines 16A0a, 16A1a, 16B0a and 16B1a from the first access request identification data buffers 16A0, 16A1, 16B0 and 16B1, are received at the same time by the second read data buffer circuits 15A0, 15A1, 15A2, 15A3, 15B0, 15B1, 15B2 and 15B3.

In the second read data buffer circuits 15A0, 15A1, 15A2, 15A3, 15B0, 15B1, 15B2 and 15B3, the selection circuit 150 disposed in each of the second read data buffer circuits is controlled on the basis of the control data for identifying the access request (16A0a, 16A1a, 16B0a and 16B1a) consisting of the device number of the first access request stack circuits and the first access request identification data, and the read data are stored in the data buffer. In other words, the control of the selection circuit 150 allows the read data to be stored in either of the data buffer B00 (151A), B01 (151B), B02 (151C) or B03 (151D) in each of the second read data buffer circuits 15A0, 15A1, 15A2, 15A3, 15B0, 15B1, 15B2 and 15B3 corresponding to the respective stacks S00, S01, S02 and S03 of the first access request stack circuits 10A0, 10A1, 10A2, 10A3, 10B0, 10B1, 10B2 and 10B3. For instance, when the first access request identification data (16A0a) for the access request are "00", the read data for the access request are stored in the data buffer B00 (151A) within the second read data buffer circuit 15A0.

On the other hand, independently from the storing of the read data in each of the data buffers, a read data sending control circuit (sending control circuit) 18A1 for controlling the sending of the read data allows the read data stored in the respective second read data buffer circuits 15A0, 15A1, 15A2 and 15A3 to be simultaneously sent to the access request controllers (32A0, 32A1, 32A2 and 32A3) as a sender of the access request. A sending control circuit 18B1 for control of the transmission of the read data simultaneously sends the read data stored in the second read data buffer circuits 15B0, 15B1, 15B2 and 15B3 to the access request controller (32B0, 32B1, 32B2 and 32B3) as a source of issuing the access requests.

For instance, although the details will be described hereinafter, the sending control circuit 18B1 for control of the transmission of the read data is provided with the report data through the signal lines 18A0a, 18A0b, 18A0c and 18A0d, the report data indicating that all the access requests stored in the identical stack positions within four of the first stack circuits 10A0, 10A1, 10A2 and 10A3 have been sent from the first ID controlling circuit 18A0 to the store bank. In other words, these signals (signals of the signal lines 18A0a, 18A0b, 18A0c and 18A0d) indicate that all read data are stored in one of the data buffers B00 (151A), B01 (151B), B02 (151C) and B03 (151D) of the four second read data buffer circuits 15A0, 15A1, 15A2 and 15A3 after a predetermined period of time has been elapsed (the time corresponding to the access time of the store bank). Hence, this signal can be utilized for displaying the effectiveness of the read data in the corresponding read data buffers B00 (151A), B01 (151B), B02 (151C) and B03 (151D) by passing the signal through the buffer for queuing the access time of the store bank and reading it in the predetermined period of time.

In order to send the read data of the read data buffers displaying the effectiveness in order in the manner as described hereinabove, the control circuit 18A1 sends the signal, indicative of the position of the read data buffer, from these signals (signals of the signal lines 18A0a, 18A0b, 18A0c and 18A0d) indicating the effectiveness of the read data through the signal line 18A1a to each of the second read data buffer circuits 15A0, 15A1, 15A2 and 15A3. This arrangement can allow, for example, the second read data buffer circuits 15A0 to consecutively send the read data stored in each of the data buffers B00 (151A), B01 (151B), B02 (151C) and B03 (151D).

The control signal for sending the read data to be sent from the signal line 18A1a is concurrently received by the four second read data buffer circuits 15A0, 15A1, 15A2 and 15A3 and inputted into each of the output control circuits 153. By controlling the selection circuit 152 by the signal line 153a, each of the output control circuits 153 sends the read data from the data buffer located in the position designated by the control signal (18A1a) for sending the read data. This allows read data from each of the four second read data buffer circuits 15A0, 15A1, 15A2 and 15A3 to be sent in synchronization with and parallel to each other to the respective access request control circuits (32A0, 32A1, 32A2 and 32A3, as shown in FIG. 1).

As described hereinabove, the store controller allows the access request to overtake the other access requests and can efficiently send the access request by adding the control data to the access requests, for example, from two data processing units with four elements operating parallel to each other, in each stage of the multiple-stage priority circuit and by processing the access request using the control data. In addition, the access request can be processed in multiple stages at a high speed by providing the priority circuit with the access request identification data (first access request identification data, second access request identification data or the like) individually in each stage. By assuring the order at each stage, the control data, which are employed only for the processing at each stage, can be buffered at each stage, thereby reducing the amount of data to be added to each access request. It is also possible to send the read data to four parallel elements and to return the read data for the four elements received concurrently to the access request controller in the order of receipt of the access requests in synchronization with and parallel to each other.

The circuit configuration of each portion of the block will now be described, whose details are not shown in the circuit block diagram of FIG. 3.

Figure 4:
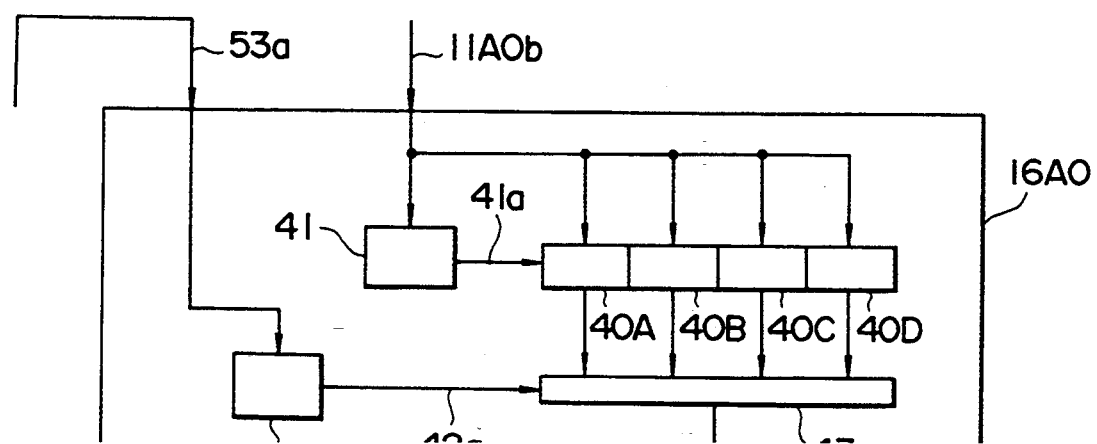
FIG. 4 is a block diagram showing details of the circuit structure of a first ID buffer.

FIG. 4 is a block diagram showing the details of the circuit configuration of the first ID buffer. When the access request whose order of priority has been decided is sent through the signal line 11A0a, the control data for identifying the access requests, consisting of the first access request identification data and the device of the first access request stack circuit, are sent at the same time through the signal line 11A0b to the first ID buffer 16A0 in the first priority circuit 11A0. As shown in FIG. 4, the first ID buffer 16A0 comprises stacks 40A, 40B, 40C and 40D, in which the control data for identifying the access requests are temporarily stored, and each of the stacks 40A, 40B, 40C and 40D is selected by the signal line 41a from the input control circuit 41. The input control circuit 41 stores the control data in each of the stacks 40A, 40B, 40C and 40D in order by renewing the stack positions in order and staggering them in the manner as indicated by "0"→"1"→"2"→"3"→"0"→ . . .

The control data are generated from the selection circuit 43 by the control of the output control circuit 42 controlled by the signal from the second ID control circuit 128 of the second stack circuit 12A0, which is indicative of the buffer number from the signal line 53a. In other words, the selection circuit 42 selects one of the stacks 40A, 40B, 40C and 40D and generates to it the signal for designating the stack position of the control data through the signal line 42a. The control data for identifying the access requests to be transmitted from the first ID buffer 16A0 are sent to the first ID control circuit 18A0 and each of the second read data buffers 15A0, 15A1, 15A2 and 15A3 through the signal line 16A0a.

FIG. 5 is a circuit diagram showing a detailed configuration of the control circuit for controlling the second access request identification data. The second ID control circuit 128 in the second stack circuit 12A0 is provided with the access request identifying control data, consisting of the second access request identification data and the device number of the second stack circuit, through the signal line 13A0b, at the same time when the access request whose order of priority has been decided in the second priority circuit 13A0 is sent to the store bank 20A0 through the signal line 13A0a.

In other words, the second ID control circuit 128 sends the control data through the signal line 13A0b to each of the second stack circuits 12A0 and 12A1 as senders of the access requests, after the access request involved with the processing for determining the priority string of the access request has been selected in company with the transmission of the access request from each of the second stack circuits. The second ID control circuit 128 assures the order of the access requests in response to the access request identifying control data.

As shown in FIG. 5, the second ID control circuit 128 inputs the second access request identification data from the signal line 13A0b into a decoder 50 and sets the flip-flops 41A, 51B, 51C and 51D corresponding to the decoded results "0", "1", "2" and "3" to "1". A counter 54 composed of the flip-flops is a quaternary counter indicating values "0", "1", "2" and "3". A +1 addition circuit 55 changes the order number of the counter 54, as indicated by "0"→"1"→"2"→"3"→"0"→ . . . , in order by the signals from the signal lines 53a. The decoder 56 decodes the value of the counter 54 and the output decoded by the decoder 56 is added to each of AND gates 52A, 52B, 52C and 52D to which the output from each of the flip-flops 51A, 51B, 51C and 51D is added. The output from each of the AND gates 52A, 52B, 52C and 52D is added to a reset terminal of each of the flip-flops 51A, 51B, 51C and 51D and further to an OR gate 53. The output of the OR gate 53 is then added to the +1 addition circuit 55 via the signal line 53a, thereby renewing the value of the counter 54. The signal of the signal line 53a is then sent to the first ID buffer 16A0 as a signal which has chosen the access request, and is further sent for the control of the output of the read data of the first read data buffer 14A0.

The circuit having the configuration as described hereinabove detects whether the value of the flip-flops 51A, 51B, 51C and 51D corresponding to the value indicated by the counter 54 is "1" or not When the value is "1", the flip-flops 51A, 51B, 51C and 51D are reset to "0" and the signal of the signal line 53a is set to "1" by the OR gate 53, thereby renewing the value of the counter 54 by adding +1 thereto. This operation does not allow the signal selected for the subsequent access request by the second priority circuits 13A0, 13A1, 13A2 and 13A3 to be transmitted beforehand, even if the order of processing the access requests would be changed, when the access request is inputted into the second priority circuits 13A0, 13A1, 13A2 and 13A3 from the second stack circuit 12A0. For instance, when the access request R0 to which the second access request identification data "00" are added is sent to each of the second priority circuits 13A0 and 13A1 from the second stack circuit 12A0, followed by sending the access request R1 with the second access request identification data "01", added thereto and, when the access request R1 is chosen before the access request R0, the flip-flop 51B is set to "1" before the flip-flop 51A while the counter 54 is reset to "0". However, the signal of the signal line 53a is set to "1" because the flip-flop 51A is set to "1", followed by resetting the flip-flop 51A to "0" and then setting the value of the counter 54 to "1". Thereafter, the signal of the signal line 53a is set to "1" because the value of the flip-flop is "1".

As described hereinabove, the second ID control circuit 12B sends the report data to the first ID buffer 16A0 through the signal line 53a, the report data reporting on the fact that the priority of the access request sent from the second stack circuit 12A0 is determined and chosen by the second priority circuits 13A0, 13A1, 13A2 and 13A3. The report data are sent for the output control of the read data of the first read data buffer circuit 14A0.

Figure 6:
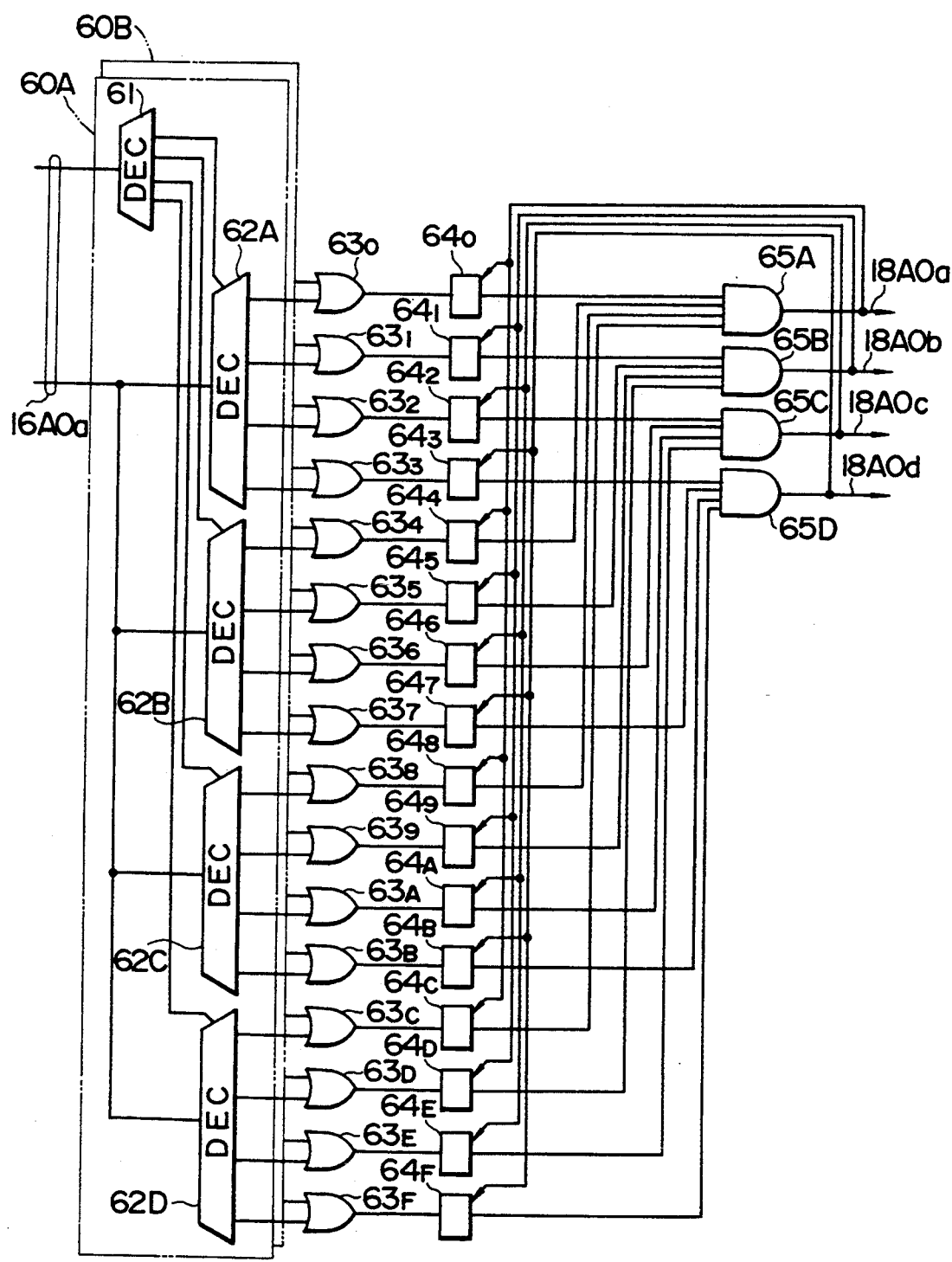
FIG. 6 is a circuit diagram showing details of the circuit structure of a first access request identification data control circuit (first ID control circuit).

FIG. 6 is a circuit block diagram showing the details of the circuit configuration of the first ID control circuit. The first ID control circuit 18A0 controls the first ID buffer 16A0 through the signal line 53a from the second ID control circuit 12B by selecting the access request by the second priority circuit 13A0, and the first ID control circuit 18A0 is provided with the device number of the first ID control circuit and the first access request identification data for the access request through the signal line 16A0a. Likewise, although not shown in FIG. 6, the device number of the first stack circuit for the access request selected in the other control system and the first access request identification data are also inputted from the first ID buffer 16A1 through the signal line 16A1a.

As shown in FIG. 6, in the first ID control circuit 18A0, the device number of the first stack circuit inputted from the signal line 16A0a and the first access request identification data are inputted into each of the decoders 61, 62A to 62D of a decoding circuit 60A. The decoder 61 decodes the device numbers of the first stack circuits 10A0, 10A1, 10A2 and 10A3, while the decoders 62A, 62B, 62C and 62D decode the respective stack numbers of the first stack circuits 10A0, 10A1, 10A2 and 10A3. The first stack circuits storing the access request and their device numbers are identified by a combination of the decoder 61 with the decoders 62A, 62B, 62C and 62D. By the signal generated by each of the decoders 61, 62A, 62B, 62C and 62D of the decoding circuit 60A, either one of flip-flops $64_{0-9}$ or $64_{A-F}$ for displaying the effectiveness of the access request identification data corresponding to the access request stack circuits for the signal identified by the decoding circuit 60A is set to "1" through OR gates $63_{0-9}$ or OR gates $63_{A-F}$. Likewise, the access request identifying control data sent by the signal line 16A1a through the first ID buffer 16A1 from the first priority circuit 11A1 of the other control system is inputted into the decoding circuit 60B and then decoded by the decoders thereof, followed by setting to "1" either one of the flip-flops $64_{0-9}$ or $64_{A-F}$ for displaying the effectiveness of the access request identification data corresponding to the access request stack circuits for the signal identified by the decoding circuit 60B through the OR gates $63_{0-9}$ or $63_{A-F}$.

It is to be noted that the fact that the flip-flops for displaying the effectiveness of the access request identification data corresponding to the identical stack numbers of the first stack circuits 10A0, 10A1, 10A2 and 10A3, i.e. all the flip-flops $64_0$, $64_4$, $64_8$ and $64_C$, are set to "1" means that all four access requests are sent to the storage 2, which arrive at the first stack circuits 10A0, 10A1, 10A2 and 10A3 at the same time and are processed so as to set to the stack position S00 all of the first stack circuits 10A0, 10A1, 10A2 and 10A3. Hence, the AND gate 65A detects all of the flip-flops $64_0$, $64_4$, $64_8$ and $64_C$ being set to "1", and the detected result signal is outputted from the signal line 18A0a. The signal from the signal line 18A0a sets the flip-flop 101A for controlling the transmission of the access request corresponding to the stack S00 within each of the first stack circuits 10A0, 10A1, 10A2 and 10A3 to "1".

The subsequent access request stored in the stack S00 of the first stack circuits 10A0, 10A1, 10A2 and 10A3 is brought into a state in which it is capable of being transmitted to the first priority circuits 11A0 and 11A1. It is to be noted herein that the flip-flops $64_0$, $64_4$, $64_8$ and $64_C$ for displaying the effectiveness of the access request identification data corresponding to the signal are reset to "0" at the time when the signal from the signal line 18A0a is sent to the first stack circuits 10A0, 10A1, 10A2 and 10A3.

For the access request stored in the other stacks S01, S02 and S03 of the first stack circuits 10A0, 10A1, 10A2 and 10A3, the signals from the signal lines 18A0b, 18A0c and 18A0d are sent to the first stack circuits 10A0, 10A1, 10A2 and 10A3 in the same operation as described immediately hereinabove.

FIG. 7 is a block diagram showing the detailed circuit configuration of the control circuit for sending the read data.

The sending control circuit 18A1 sends the read data stored in the read data buffer circuits 15A0, 15A1, 15A2 and 15A3 at the same time to the access request controllers 32A0, 32A1, 32A2 and 32A3, independently from the operation for storing the read data in each of the data buffers.

To the sending control circuit 18A1 are sent four signals via the four signal lines 18A0a, 18A0b, 18A0c and 18A0d from the first ID control circuit 18A0, each signal being indicative of the access request stored in the identical stack position of the four respective first stack circuits 10A0, 10A1, 10A2 and 10A3 having been sent to the store bank (the signal being a signal reporting on the finish of the processing for selecting the priority of the access request). The four signals (18A0a, 18A0b, 18A0c and 18A0d) mean that all of the read data have been stored in one of the data buffers B00, B01, B02 and B03, for example, in the data buffer B00, of each read data buffer circuit 15A0, 15A1, 15A2 and 15A3 in a predetermined fixed time (a time corresponding to the access time of the store bank). Therefore, as shown in FIG. 7, the sending control circuit 18A1 allows the four signals to pass through the buffers 74A, 74B, 74C and 74D for queuing the access time of the store bank and sets the flip-flops 70A, 70B, 70C and 70D. This arrangement can display the effectiveness of the read data in the position (B00, B01, B02 and B03) of the read data buffer corresponding to each of the flip-flops 70A, 70B, 70C and 70D.

As the data of the positions of the read data buffers whose effectiveness has been displayed is sent in order from the data buffers B00, B01, B02 and B03 by each of the flip-flops 70A, 70B, 70C and 70D of the sending control circuit 18A1, the sending control circuit 18A1 sends the control signal to the buffer circuits 15A0, 15A1, 15A2 and 15A3 through the signal line 18A1a.

In order to perform this operation as shown in FIG. 7, the sending control circuit 18A1 is constructed such that the value of a pointer 74 for fetching the read data is decoded by a decoder 75 and fed to the AND gates 71A, 71B, 71C and 71D. To the AND gates 71A, 71B, 71C and 71D are also fed the signals from the flip-flops 70A, 70B, 70C and 70D for displaying the effectiveness of the aforesaid read data, and the signals of the flip-flops 70A, 70B, 70C and 70D for displaying the effectiveness of the read data corresponding to the buffer positions designated by the value of the pointer 74 for fetching the read data are fetched by the AND gates 71A, 71B, 71C and 71D. These signals are outputted through an OR gate 72 by setting an output flip-flop 73A.

When either one of the flip-flops 70A, 70B, 70C and 70D for displaying the effectiveness of the access request indicates "0", the control signal for reading the read data to be sent from the signal line 18A1a is shut off by the AND gates 71A, 71B, 71C and 71D and the value of the pointer 74 is held until the flip-flops 70A, 70B, 70C and 70D for displaying the effectiveness of the read data are set to "1". This occurs when the read data corresponding to at least one of the four access requests, which are stored in the stacks in the positions designated by the values of the pointer 74 for fetching the read data in correspondence with each of the first stack circuits 10A0, 10A1, 10A2 and 10A3, does not arrive at the read data buffers B00, B01, B02 and B03. Thereafter, as each of the flip-flops 70A, 70B, 70C and 70D is set to "1", the AND gates 71A, 71B, 71C and 71D and the OR gate 72 detect the setting to "1" and the read control signal is sent via the signal line 18A1a through the output flip-flop 73A. At the same time, the flip-flops 70A, 70B, 70C and 70D are reset to "0" as designated by the value of the pointer 74 from the OR gate 72 through the signal line 72a, and the +1 addition circuit 76 adds +1 to the value of the pointer 74 at the same timing, thereby renewing the value thereof.

With this arrangement, the read control signals sent from the sending control circuit 18A1 through the signal line 18A1a are received at the same time by the four read data buffer circuits 15A0, 15A1, 15A2 and 15A3 and inputted into the output control circuit 153 of each of the buffer circuits 15A0, 15A1, 15A2 and 15A3. The output control circuit 153 controls the selection circuit 152 by the signal from the signal line 153a and the read control signal from the signal line 18A1 fetches the read data of the buffer number designated. This allows the read data from the four read data buffer circuits 15A0, 15A1, 15A2 and 15A3 to be sent to the access request controllers 32A0, 32A1, 32A2 and 32A3 in synchronization with the data and in parallel to the sending of the access request.

Although the present invention is described hereinabove by way of one embodiment, it is to be understood that the present invention encompasses other variants and modifications without departing from the spirit of scope of the present invention.

A computer system in another example using the store control system will be described hereinafter. The computer system is to issue plural access requests from plural access request controllers in correspondence with access to vector data in each of a plurality of data processors (vector data processors), and processes the access requests for assuring the order of the vector data. Further, the access requests are processed for assuring the order of the vector elements of the vector data when the plural access elements are issued from the plural access request controllers in correspondence with access of each of the vector elements of vector data in each of the data processors.

In the other embodiments of the computer system according to the present invention, first and second priority control circuits are provided and the access requests are processed for assuring their order between the vector data or between the vector elements of vector data by processing for the control of priority of the access requests in multiple stages in these first and second priority control circuits.

Description will now be made of another embodiment according to the present invention with references to FIGS. 8 to 16.

Figure 8B:
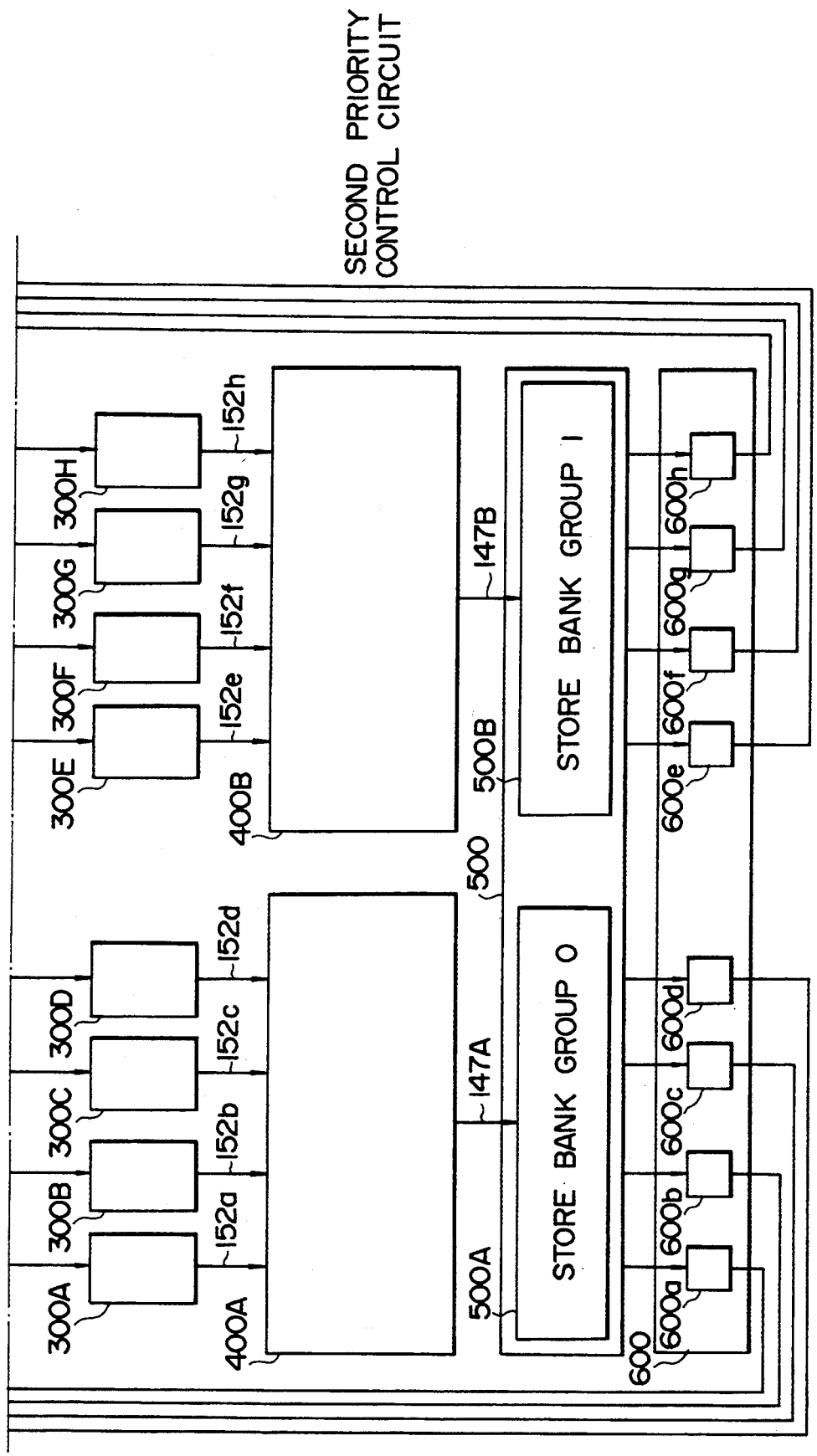

FIG. 8 shows another configuration of the computer system according to the present invention.

As shown in FIG. 8, reference numerals 100A and 100B denote vector data processors. The vector data processor 100A comprises plural vector arithmetic units 100A1a, 100A1b, 100A1c and 100A1d (hereinafter sometimes referred to generically as 100A1), vector registers 100A2a, 100A2b, 100A2c and 100A2d (hereinafter sometimes referred to generically as 100A2), and access request controllers 100A3a, 100A3b, 100A3c and 100A3d (hereinafter sometimes referred to generically as 100A3) for generating and issuing access requests and performing address calculations. The vector data processor 100B comprises plural vector arithmetic units 100B1e, 100B1f, 100B1g and 100B1h (hereinafter sometimes referred to generically as 100B1), vector registers 100B2e, 100B2f, 100B2g and 100B2h (hereinafter sometimes referred to generically as 100B2), and access request controllers 100B3e, 100B3f, 100B3g and 100B3h (hereinafter sometimes referred to generically as 100B3) for forming and issuing access requests and performing address calculations.

Reference numerals 200A, 200B, 200C and 200D denote first priority control circuits for sending access requests corresponding to store bank groups by stacking the access requests from the vector data processors and the address data added to the access requests and decoding the address data.

Reference numerals 300A–300H denote access request holding circuits for stacking the access requests sent from the first priority control circuits.

Reference numerals 400A and 400B denote second priority control circuits for deciding and selecting the order of priority of the stacked access requests and sending the chosen access requests to the store banks.

Reference numeral 500 denotes a main storage for accepting an access request, processing and returning the read data at the time of reading.

Reference numerals 600A–600H (hereinafter sometimes referred to generically as 600), inclusive, denote data buffers for rearranging data read from each of store bank groups 500A and 500B of the main storage 500 so as to correspond to the vector data processors issuing the access request.

Description will be made of a summary of the operation in the computer system by taking the reading operation from the main storage and the writing operation in the main storage as an example.

When the vector data are read from the main storage 500 and stored in the vector register 100A2 or 100B2, each of the vector elements is formed as an access request assigned to each of the access request controllers as follows:

100A3a/100B3e: 0, 4, 8, . . . , $4n^{th}$ element

100A3b/100B3f: 1, 5, 9, . . . , $(4n+1)^{th}$ element

100A3c/100B3g: 2, 6, 10, . . . , $(4n+2)^{th}$ element

100A3d/100B3h: 3, 7, 11, . . . , $(4n+3)^{th}$ element (where n is 0 or a positive integer)

Figure 9B:
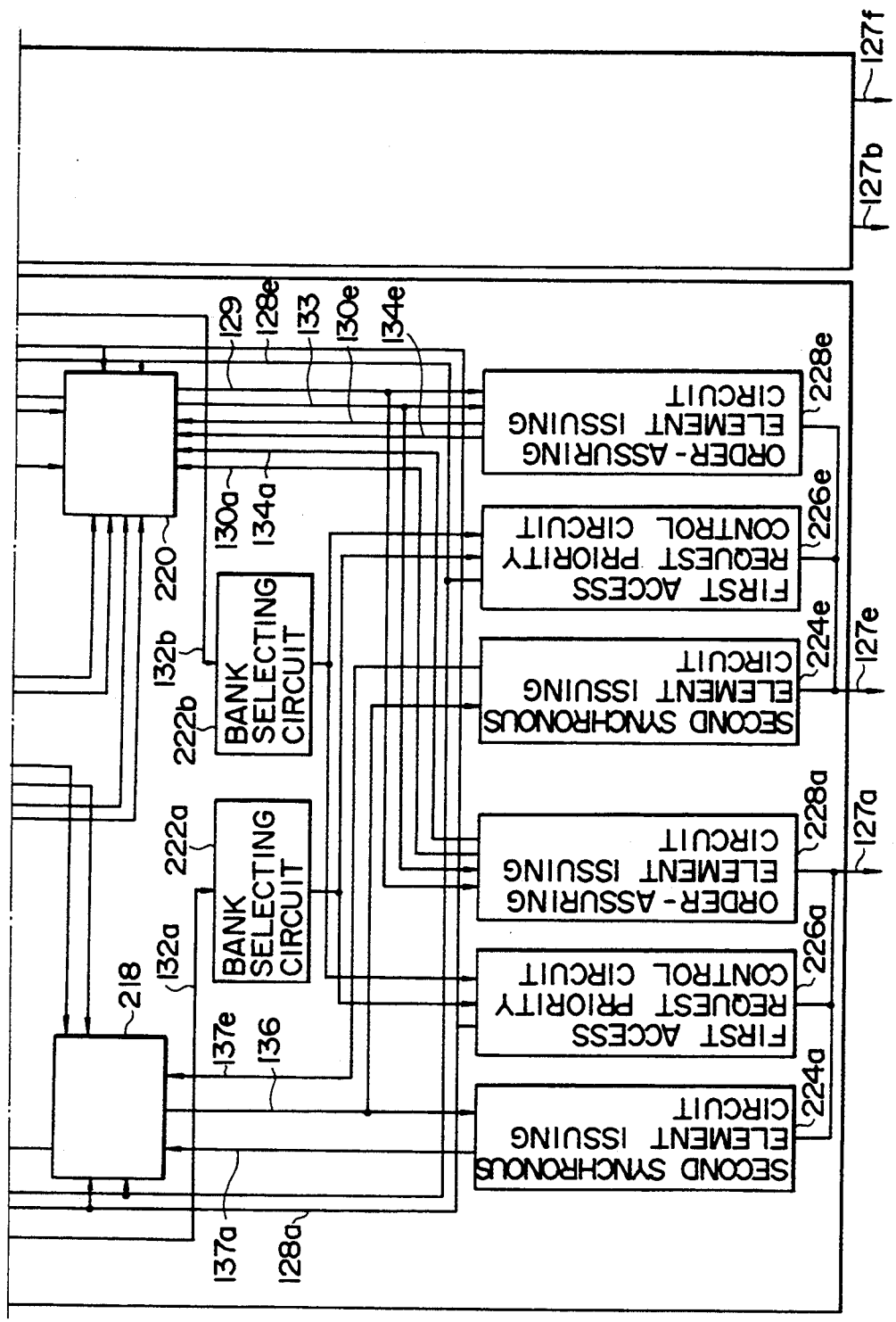
Figure 10A:
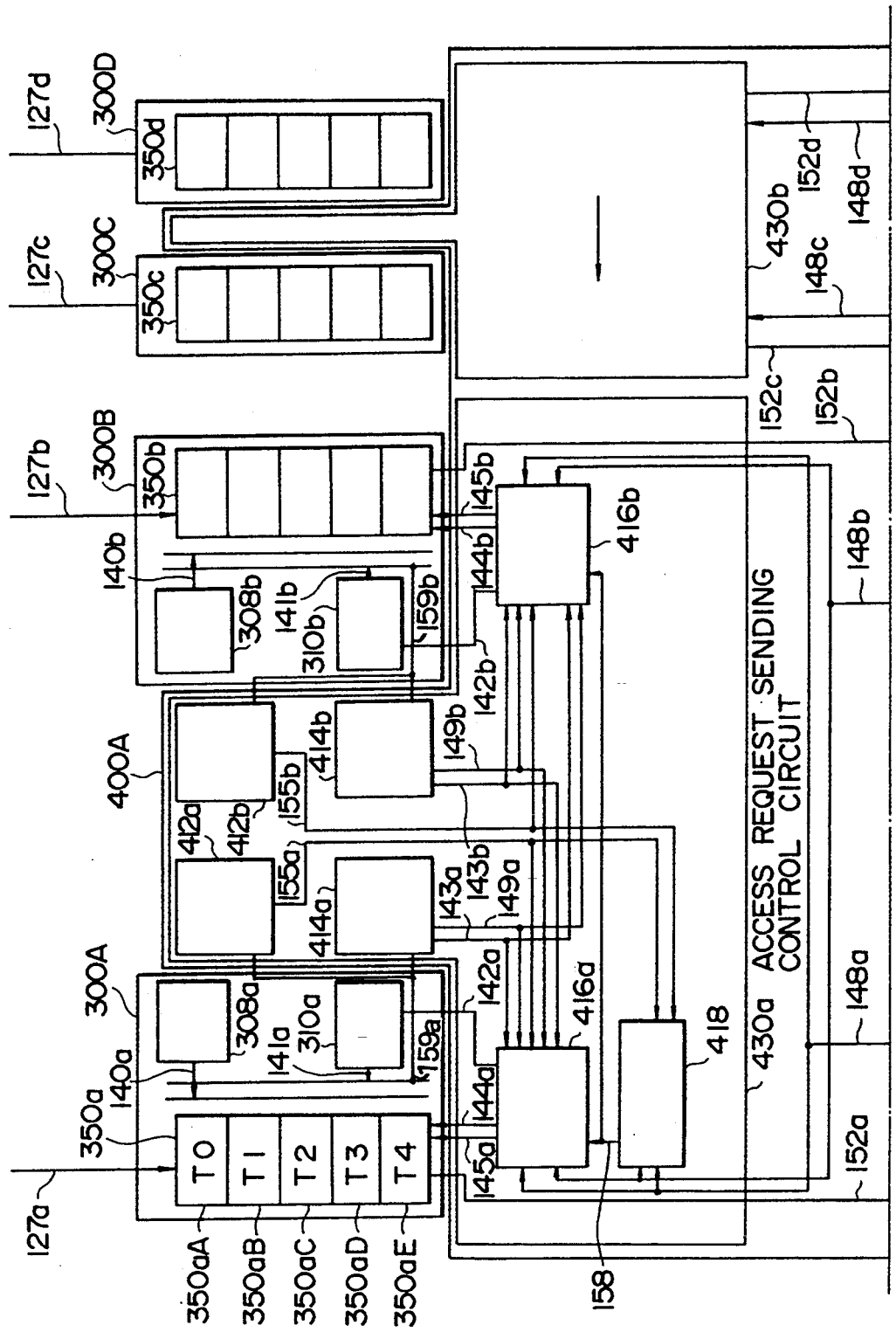

The access request controller 100A3 to which the vector register 100A2 is connected calculates the address of the access request to be simultaneously issued and sends the access request to the corresponding first priority control circuit 200A or 200B, while the access request controller 100B3 to which the vector register 100B2 is connected calculates the address of the access request to be simultaneously issued and sends the access request to the respective first priority control circuit 200C or 200D. More specifically, as shown in FIG. 9, the access request controllers 100A3a and 100A3b connected to the vector registers 100A2a and 100A2b calculate the addresses of the simultaneously issued access requests and send the access requests to the respective first priority control circuit 200A, while the addresses of the access requests issued simultaneously are calculated by the access request controllers 100A 3c and 100A3d to which the vector registers 100A2c and 100A2d are connected, respectively, and sent to the first priority control circuit 200B. Likewise, the access request controllers 100B3e and 100B3f connected to the respective vector registers 100B2e and 100B2f calculate the addresses of the access requests simultaneously issued and send the access requests to the first priority control circuit 200C, while the access request controllers 100B3g and 100B3h connected to the respective vector registers 100B2g and 100B2h calculate the address of the access requests and send the access requests to the first priority control circuit 200D.

Each of the first priority control circuits 200A, 200B, 200C and 200D sends the access requests to the corresponding access request holding circuits 300A to 300H, inclusive, for holding the target access request on the basis of the address added to the access request. Specifically, the first priority control circuit 200A sends the access requests to the access request holding circuits 300A and 300E and the first priority control circuit 200B sends the access requests to the access request holding circuits 300B and 300F, while the first priority control circuit 200C sends the access requests to the access request holding circuits 300C and 300G and the first priority control circuit 200D sends the access requests to the access request holding circuits 300D and 300H.

The access request holding circuits 300A to 300H send the access requests to the second priority control circuits 400A and 400B. More specifically, the access request holding circuits 300A, 300B, 300C and 300D send the access requests to the second priority control circuit 400A, while the access request holding circuits 300E, 300F, 300G and 300H send them to the second priority control circuit 400B.

Each of the second priority control circuits 400A and 400B selects one access request in accordance with a predetermined order of priority and sends the access request to the corresponding store bank groups 500A and 500B, respectively, when plural access requests compete with each other.

The read data corresponding to the access requests sent to each of the store bank groups 500A and 500B are then sent to the data buffer unit 600 in a fixed time (corresponding to the access time of a RAM constituting the main storage) and are set in the read data buffers 600a to 600h corresponding to the access request controllers 100A3a to 100A3d and 100B3e to 100B3h, respectively.

The read data are stored in each of the vector registers 100A2a to 100A2d or 100B2e to 100B2h in the order of issuance of the access requests at the time when the data of all the four access requests issued simultaneously by the access request controllers 100A3a to 100A3d or 100B3e to 100B3h, respectively, have been read out.

The vector registers 100A2a to 100A2d and 100B2e to 100B2h and each of the elements are assigned as follows:

$100A2a/100B2e$: 0, 4, 8, . . . , $(4n)^{th}$ element $100A2b/100B2f$: 1, 5, 9, . . . , $(4n+1)^{th}$ element $100A2c/100B2g$: 2, 6, 10, . . . , $(4n+2)^{th}$ element $100A2d/100B2h$: 3, 7, 11, . . . , $(4n+3)^{th}$ element (where n is 0 or a positive integer)

When the data stored in the vector registers 100A2a to 100A2d or 100B2e to 100B2h are processed, each of the vector elements is assigned to the vector arithmetic units 100A1a to 100A1d or 100B1e to 100B1h, respectively, and the operation results are assigned again in the vector registers as follows: Arithmetic units $100A1a/100B1e$: 0, 4, 8, . . . , $(4n)^{th}$ element $100A1b/100B1f$: 1, 5, 9, . . . , $(4n+1)^{th}$ element $100A1c/100B1g$: 2, 6, 10, . . . , $(4n+2)_{th}$ element $100A1d/100B1h$: 3, 7, 11, . . . , $(4n+3)^{th}$ element (where n is 0 or a positive integer)

In the arithmetic operation, the four vector arithmetic units 100A1a to 100A1d or 100B1e to 100B1h execute the operation in full synchronization with each other and the operation results are stored at the same time in the vector registers 100A2a to 100A2d or 100B2e to 100B2h, respectively.

In writing the data stored in the vector registers 100A2a to 100A2d or 100B2e to 100B2h in the main storage 500, the element is divided and assigned to the access request controllers 100A3a to 100A3d or 100B3e to 100B3h, and the access request is sent to each of the corresponding first priority control circuits 200A, 200B, 200C and 200D, together with the address data, in the same manner as in the read operation as described hereinabove. The processing up to the sending of the access request to the main storage 500, which follows, is implemented in the same manner as in the read operation as described hereinabove.

Referring to FIG. 9, description will be made of the configuration of the first priority control circuit 200A.

As shown in FIG. 9, the first priority control circuit 200A comprises access request stack circuits 250a and 250b, stack input control circuits 208a and 208b, stack output control circuits 210a and 210b, first synchronous element detecting circuits 212a and 212b, access request detecting circuits 214a and 214b for detecting an access request for assuring order (hereinafter sometimes referred to as an order-assuring access request), sending control circuits 216a and 216b, first synchronous element control circuit 218, access request control circuit 220 for controlling the order-assuring access request, bank selecting circuits 222a and 222b, second synchronous element issuing circuits 224a and 224b, first access request priority control circuits 226a and 226e, and element issuing circuits 228a and 228e for issuing an element for assuring its order (hereinafter sometimes referred to as an order-assuring element).

The first priority control circuits 200B, 200C and 200D have substantially the same configuration as the first priority control circuit 200A.

FIG. 10 shows the configurations of the access request holding circuits 300A and 300B and the second priority control circuit 400A.

As shown in FIG. 10, the access request holding circuit 300A comprises an access request stack circuit 350a, a stack input control circuit 308a, and a stack output control circuit 310a. The access request holding circuits 300B–300H have substantially the same configurations as the access request holding circuit 300A.

Description will next be made on the assurance of the order between the elements in the data processor.

1. Assurance of the order between the vector elements

A. Summary of operation for assuring the order of the vector elements

As shown in FIG. 8, each of the vector data processors 100A and 100B simultaneously issues four access requests of vector data.

For instance, the vector data processor 100A issues access requests of the 0th, 1st, 2nd and 3rd elements at the same time. The access requests of the 0th element and the 1st element are transmitted to the first priority control circuit 200A through the signal lines 18a and 18b, respectively. On the other hand, the access requests of the 2nd and 3rd elements are transmitted to the first priority control circuit 200B through the signal lines 18c and 18d, respectively.

Thereafter, the vector data processor 100A issues access requests of the 4th, 5th, 6th and 7th elements at the same time. The access requests of the 4th and 5th elements are transmitted to the first priority control circuit 200A through the signal lines 18a and 18b, while the access requests of the 6th and 7th elements are transmitted to the first priority control circuit 200B through the signal lines 18c and 18d, respectively.

Furthermore, access requests are likewise issued in the order of the element number and sent to the first priority control circuit 200A or 200B.

When the vector data processor 100A is intended to make access to the vector elements while keeping their order, the access request for these vector elements is issued as an access request for assuring the order of the vector elements. The last element to which the vector data processor 100A is intended to make access is issued as a last access request for assuring order (hereinafter sometimes referred to as a last order-assuring access request).

As will be described hereinafter, when the order of a preceding vector instruction and subsequent vector instruction for making reference to the main storage is intended to be assured, the vector data processor 100A issues a first synchronous element for synchronizing the vector data between the access requests for the vector data and sends it to the first priority control circuit 200A or 200B through the signal lines 118a or 118d.

FIG. 11 shows kinds of instructions to be issued by the vector data processor to the first priority control circuit as well as kinds of instructions to be issued by the access request holding circuit to the second priority control circuit through the access request holding circuit.

More specifically, FIG. 11A shows the access requests to be issued by each of the vector data processors 100A and 100B. In FIG. 11A, bit 0 is the "V" bit indicative of a valid access request or an invalid access request, and bits 1 and 2 are codes indicating the kind of instruction. The instruction means that the access request is valid when the bit 0 is '1', while the access request is invalid when the bit 0 is '0'.

The kind of instruction is such that it is a usual access request when the bits 1 and 2 are '00', an order-assuring access request when the bits 1 and 2 are '10', and a last access request for assuring order when the bits 1 and 2 are '11', respectively.

To the access request are added an address, indicative of a partner to which access is made, and data to be stored as an operand. To the first synchronous element, however, is added no such operand.

FIG. 11B shows kinds of instructions to be issued by or sent from the first priority control circuit 200A or 200B. In FIG. 11B, bit 0 is a V bit showing validity or invalidity of an access request, and bits 1 to 3 represent codes showing the kind of instruction. It is noted that the instruction is valid when the bit 0 is '1', and the instruction is invalid when the bit 0 is '0'. The kind of the instruction is such that the instruction is an ordinary access request when bits 1 to 3 are '000', an access request for assuring order (an order-assuring access request) when the bits 1 to 3 are '001', a second synchronous element when the bits 1 to 3 are '010', it is an element for assuring order when the bits 1 to 3 are '011', and a final element for assuring order (a final order-assuring element) when the bits 1 to 3 are '101', respectively.

For instance, the first priority control circuit 200A which has received two order-assuring access requests for the first element and the second element, each constituting the identical vector data, from the vector processor 100A stores the order-assuring elements in the access request holding circuits 300A and 300B. Thereafter, the first priority control circuit 200A stores the objective order-assuring access requests in the access request holding circuit 300A or 300B in the order of the elements with smaller element numbers in accordance with the partner to which access is made.

The order-assuring access requests for the vector data which follow are processed in the same manner as described hereinabove.

The first priority control circuit 200B performs similar processing and stores the order-assuring element and the order-assuring access requests for the 3rd and 4th elements in the access request holding circuits 300B and 300F.

In the second priority control circuit 400A, the access requests stored in the access request holding circuits 300A and 300B are sent in order to the store bank 500A. However, when the second priority control circuit 400A detects the element for assuring order, it waits until all of the order-assuring elements are given to both of the access request holding circuits 300A and 300B. In this case, it is noted that the order-assuring element for the access request holding circuit 300A corresponds to the first and second access requests for assuring order, and the order-assuring element for the access request holding circuit 300B corresponds to the first and second access requests for assuring order.

As the elements for assuring order have been given to both of the access request holding circuits 300A and 300B, the access request holding circuit 300A sends an order-assuring access request and an access request up to the next order-assuring element, and then the access request holding circuit 300B sends an order-assuring access request and an access request up to the following element for assuring order.

Thereafter, the processing is implemented in the same manner as described hereinabove until the final order-assuring element has been detected.

As a result, the order-assuring access request for the store bank group 0 out of the order-assuring access requests for the first and second elements from the access request holding circuit 300A is sent to the main storage from the second priority control circuit and, thereafter, the order-assuring access request for the store bank group 0 out of the order-assuring access requests for the 3rd and 4th elements from the access request holding circuit 300B is sent to the main storage from the second priority control circuit. This arrangement can assure the order of the access requests.

B. Details of first priority control circuit (FIG. 9 )

Details of the first priority control circuit will be described hereinafter.

The ordinary operation of the first priority control circuit will first be described.

The vector data processor 100A issues the access request and sends it to the access request stack circuits 250a and 250b through the respective signal lines 118a and 118b.

The access request stack circuit 250a holds the access request from the vector data processor 100A in either of the following stacks, as indicated by the stack input control circuit 208a: i.e. stacks S0 (250aA), S1 (250aB), S2 (250aC), S3 (250aD) and S4 (250aE).

The stack input control circuit 208a is a circuit for designating the stack positions S0 to S4 in which the access request is stored to the stack through a signal line 120a and, whenever one access request has been stored therein, sends through the signal line 120a a signal, indicative of the stack position in which the access request is stored next, as indicated by: S0→S1→S2→S3→S4→S0.

The access request stack circuit 250a sends the access request stored in the stacks S0 to S4 through a line 132a to a bank selecting circuit 222a from the stack positions, i.e. stack S0, as indicated by the stack output control circuit 210a, in accordance with control by a sending control circuit 216a.

The stack output control circuit 210a is a circuit for designating the stack positions S0, S1, S2, S3 and S4, from which the access request is fetched, to the stack through the signal line 121a. The stack output control circuit 210a sends a signal, indicative of the stack position from which the access request is fetched next, in the manner as indicated by S0→S1→S2→S3→S4→S0, through the signal line 121a in accordance with the control by the sending control circuit 216a, whenever an access request is fetched.

The access request stack circuit 250b, stack input control circuit 208b and the stack output control circuit 210b can be operated in the same manner as described hereinabove.

The access request stack circuits 250a and 250b suspend the sending of the access requests while a signal indicative of suspending the access request is being sent through signal lines 124a and 124b from the sending control circuits 216a and 216b, respectively. On the other hand, the access requests are sent by the access request stack circuits 250a and 250b while a signal indicative of allowance of sending the access request is being sent through signal lines 125a and 125b, respectively.

The bank selecting circuits 222a and 222b send the access requests to the first access request priority control circuit 226a when the address of the access request exists in the store bank group 0, while they send the access requests to the first access request priority control circuit 226e when the address of the access request exists in the store bank group 1.

The first access request priority control circuits 226a and 226e perform control of the priority over the access requests which are being sent from the bank selecting circuits 222a and 222b and send the access requests in order one after another through signal lines 127a and 127e, respectively.

At this time, if the access requests from both of the bank selecting circuits 222a and 222b would compete with each other in either one of the first access request priority control circuits 226a or 226e, the access request from the bank selecting circuit 222a is sent prior to the other.

Then, the first access request priority control circuits 226a and 226e send signals through signal lines 128a and 128e to the sending control circuits 216a and 216b, the signals being indicative of the access requests having been sent through the signal lines 127a and 127e, respectively.

Upon receipt of the signals from the first access request priority control circuits 226a and 226e, the sending control circuits 216a and 216b send signals through signal lines 122a and 122b, respectively, the signals being indicative of notifying the stack of the stack position in which the access request to be fetched next is held.

The stack output control circuits 210a and 210b send signals through the signal lines 121a and 121b, respectively, the signals being indicative of the stack position from which the access request is fetched next.

The access request stack circuits 250a and 250b send the access requests from the stacks indicated by the stack output control circuits 210a and 210b while the access request stack circuits 250a and 250b receive the signals for sending the access requests from the sending control circuits 216a and 216b through the signal lines 125a and 125b, respectively.

Next, description will be made of the operation for assuring the order among the vector elements by taking the assurance of the order among the elements of the vector data consisting of 16 elements ranging from the 0th element to the 15th element as an example.

The following order-assuring access requests out of the 16 order-assuring access requests are sent to the access request stack circuits 250a and 250b through signal lines 118a and 118b from the vector data processor 100A.

The order-assuring access requests to be sent to the access request stack circuit 250a through the signal line 118a are: $0^{th}$, $4^{th}$, $8^{th}$, $12^{th}$ elements.

The order-assuring access requests to be sent to the access request stack circuit 250b through the signal line 118b are: $1^{st}$, $5^{th}$, $9^{th}$, $13^{th}$ elements.

In this case, in the first access request priority control circuit, the order-assuring access request detecting circuits 214a and 214b detect whether the access requests are access requests for assuring order or not, wherein an access request is held in the stack of the stack output control circuit 210a or 210b in the access request stack circuit 250a or 250b, respectively. In other words, the order-assuring detecting circuits 214a and 214b detect to determine if the bits of the access request, i.e. bits 1 and 2, are '01'.

Now that the access request held in the stack indicated by the stack output control circuit 210a has been detected as an order-assuring access request (the 0th element) in the access request stack circuit 250a, the order-assuring access request detecting circuit 214a sends a signal through a signal line 123a to the sending control circuit 216a and the order-assuring access request control circuit 220, the signal being indicative of appearance of the order-assuring access request.

On the other hand, as the signal has been received, the sending control circuit 216a sends the signal for suspending the sending of the access request to the access request stack circuit 250a through a signal line 124a.

Then, the order-assuring access request detecting circuit 214b sends the signal indicative of appearance of the order-assuring access request through a signal line 123b to the sending control circuit 216b and the order-assuring access request control circuit 220, when the access request held in the stack indicated by the stack output control circuit 210b is detected as an order-assuring access request (the 1st element) in the access request stack circuit 250b.

On the other hand, the sending control circuit 216b sends the signal for suspending the sending of the access request to the access request stack circuit 250b through a signal line 124b when the sending control circuit 216b has received the signal.

When the signals indicative of appearance of the order-assuring access requests from both of the signal lines 123a and 123b have been received, the order-assuring access request control circuit 220 sends a signal for issuing the order-assuring element through a signal line 129 to order-assuring element issuing circuits 228a and 228e, respectively.

The order-assuring element issuing circuit 228a issues an order-assuring element and sends it through a signal line 127a upon receipt of the signal indicative of issuance of the order-assuring element. Likewise, the order assuring element issuing circuit 228b issues an order-assuring element and sends the order-assuring element through a signal line 127b when the signal indicative of issuance of the order-assuring element has been received. In this instance, a code '011' indicative of the order-assuring element is added.

When the order-assuring element is sent through the signal line 127a, the order-assuring element issuing circuit 228a sends a signal through the signal line 130a to the order-assuring access request control circuit 220. On the other hand, the order-assuring element issuing circuit 228b sends the signal indicative of the sending of the order-assuring element through the signal line 130e to the order-assuring access request control circuit 220 when the order-assuring element has been sent through the signal line 127e.

When the order-assuring access request control circuit 220 has received the signals indicative that the order-assuring elements have been sent by the order-assuring element issuing circuits 228a and 228b, the order-assuring access request control circuit 220 sends a signal through a signal line 126 to the sending control circuits 216a and 216b, respectively, for issuing a signal for resuming the sending of the access request.

When the signals for resuming the sending of the access requests have been received from the order-assuring access request control circuit 220, then the sending control circuits 216a and 216b send the signals to the access request stack circuits 250a and 250b, respectively. Then, the access request stack circuits 250a and 250b send the access requests through signal lines 132a and 132b to the bank selecting circuits 222a and 222b, the access requests (an order-assuring access request of each of the 0th element and the 1st element) coming from the stacks indicated by the stack output control circuits 210a and 210b, when the signals have been received from the sending control circuits 216a and 216b, respectively.

Upon receipt of the access request from the stack indicated by the stack output control circuits 210a and 210b, the bank selecting circuits 222a and 222b send the access request to each of the first access request priority control circuits 226a and 226e in accordance with the address of the access request.

Each of the access request priority control circuits 226a and 226e controls the priority of the access requests and sends the access request through the signal line 127a or 127e, respectively.

At this time, if the addresses of the order-assuring access requests of the 0th element and 1st element exist on the identical store bank group, i.e. store bank group 0, they are sent to the first access request priority control circuit 226a. As described hereinabove, however, the first access request priority control circuit 226a sends the order-assuring access request of the 0th element prior to the order-assuring access request of the 1st element because the access request from the store bank selecting circuit 222a precedes that from the store bank selecting circuit 222b, followed by sending the order-assuring access request of the 1st element.

Thereafter, the first access request priority control circuit 226a sends the signal, indicative of the access request having been sent, to the sending control circuit 216a through the signal line 128a and to the sending control circuit 216b through the signal line 128e. Likewise, the first access request priority control circuit 226e sends the signal indicative of sending the access request to the sending control circuit 216a through the signal line 128b and to the sending control circuit 216b through the signal line 128e.

When the sending control circuit 216a has received the signal from the first access request priority control circuit 226a, the sending control circuit 216a sends a signal for sending the signal indicative of the stack position, in which the access request is to be fetched next, to the stack output control circuit 210a through a signal line 122a. On the other hand, when the sending control circuit 216b has received the signal from the first access request priority control circuit 226e, the sending control circuit 216b sends a signal for sending the signal indicative of the stack position, in which the access request is to be fetched next, to the stack output control circuit 210b through a signal line 122b.

Then, the stack output control circuits 210a and 210b send the signals, indicative of the stack positions in which the access request is fetched next, to the stacks of the access request stack circuits 250a and 250b through signal lines 121a and 121b, respectively.

The order-assuring access request detecting circuits 214a and 214b determine if the access requests (of the fourth and fifth elements) held in the stacks indicated by the stack output control circuits 210a and 210b are access requests for assuring order. When it is detected that they are the order-assuring access requests, the processing as described hereinabove is repeated.

When the order-assuring access request detecting circuit 214a in the access request stack circuit 210a detects that the access request held in the stack indicated by the stack output control circuit 210a is a final access request for assuring order (the 12th element), it sends a signal indicative of occurrence of the final order-assuring access request (the 12th element) to the sending control circuit 216a and the order-assuring access request control circuit 220 through a signal line 121a.

The sending control circuit 216a then sends a signal for suspending the sending of the access request to the access request stack circuit 250a through a signal line 124a.

Then, when the order-assuring access request detecting circuit 214b in the access request stack circuit 210b detects that the access request held in the stack indicated by the stack output control circuit 210b is a final access request for assuring order (the 13th element), it sends a signal indicative of occurrence of the final order-assuring access request (the 13th element) to the sending control circuit 216b and the order-assuring access request control circuit 220 through a signal line 131b.

The sending control circuit 216b then sends a signal for suspending the sending of the access request to the access request stack circuit 250b through a signal line 124b.

When the order-assuring access request control circuit 220 has received the signals indicative of occurrence of the final assured access requests (the twelfth element and the thirteenth element) through both of the signal lines 131a and 131b from the respective order-assuring access request detecting circuits 214a and 214b, the order-assuring access request control circuit 220 sends the signal for issuing the order-assuring element to the order-assuring element issuing circuits 228a and 228e through signal lines 129 and 133, respectively.

After the order-assuring ,element issuing circuits 228a and 228e have received the signals for issuing the order-assuring elements from the order-assuring access request control circuit 220, then the order-assuring element issuing circuits 228a and 228e send the order-assuring elements to the access request holding circuits 300A (as shown specifically in FIG. 10a) and 300E through the signal lines 127a and 127e, respectively. In this case, the order-assuring elements are provided with a code '011' indicative of the element for assuring order.

As the order-assuring element issuing circuits 228a and 228e issue the order-assuring elements through the signal lines 127a and 127e to the access request holding circuits 300A and 300E, they also send the signals, indicative of the order-assuring element having been issued, through signal lines 130a and 130e to the order-assuring access request control circuit 220, respectively. Then, the order-assuring access request control circuit 220 transmits a signal for resuming the sending of the access request from the access request stack circuit through a signal line 126 to both of the sending control circuits 216a and 216b.

The sending control circuit 216a then sends the signal for resuming the sending of the access request through the signal line 125a to the access request stack circuit 250a, while the sending control circuit 216b sends the signal for resuming the sending of the access request through the signal line 125b to the access request stack circuit 250b.

When they have received the signals from the sending control circuits 216a and 216b, the access request stack circuits 250a and 250b send the access requests (the order-assuring access requests of the 12th element and the 13th element) from the stacks as indicated by the stack output control circuits 210a and 210b to the store bank selecting circuits 222a and 222b through the signal lines 132a and 132b, respectively.

Then, the store bank selecting circuits 222a and 222b send the access requests to both of the first access request priority control circuits 226a and 226e in accordance with the addresses of the access requests.

The first access request priority control circuits 226a and 226e perform control of the priority of the access requests and then send the access requests through the respective signal lines 127a and 127e to the respective access request holding circuits 300A and 300E.

As described hereinabove, although both of the access requests are sent to the first access request priority control circuit 226a when the address of the order-assuring access request of the 12th element and the address of the order-assuring access request of the 13th element exist in the identical store bank group (for example, in the store bank group 0), the order-assuring access request of the 12th element is sent prior to the order-assuring access request of the 13th element, followed by sending the order-assuring access request of the 13th element, because the access request from the store bank selecting circuit 222a has the priority over the access request from the store bank selecting circuit 222b in the first access request priority control circuit 226a.

When the first access request priority control circuit 226a has sent the access request, it then sends a signal to that effect to both of the sending control circuits 216a and 216b through the signal lines 128a. On the other hand, when the first access request priority control circuit 226e has sent the access request, it then sends the signal to that effect to both of the sending control circuits 216a and 216b through the signal lines 128b.

When the sending control circuits 216a and 216b have received the signals indicative of the sending of the access requests from the first access request priority control circuits 226a and 226e, the sending control circuits 216a and 216b send the signals for suspending the sending of the next access requests to the access request stack circuits 250a and 250b through the signal lines 124a and 124b, respectively. Further, the sending control circuit 216a sends a signal, indicative of receipt of the signal from the first access request priority control circuit 226a or 226e, to the order-assuring access request control circuit 220 through the signal line 139a, while the sending control circuit 216b sends a signal, indicative of receipt of the signal from the first access request priority control circuit 226a or 226e, to the order-assuring access request control circuit 220 through the signal line 139b.

The access request stack circuits 250a and 250b suspend the next access request from being sent when they receive the signal for suspending the sending of the access request from the respective sending control circuits 216a and 216b. On the other hand, the order-assuring access request control circuit 220 sends the signals for issuing the final access requests for assuring order through the signal line 133 to the order-assuring element issuing circuits 228a and 228e, when they have received the signals from both of the sending control circuits 216a and 216b.

The order-assuring element issuing circuits 228a and 228e then send the final order-assuring elements through the signal lines 127a and 127e after the final order-assuring elements are provided with a code '101' indicative of a final order-assuring element.

Further, on the other hand, the order-assuring element issuing circuits 228a and 228e issue the signals indicative of the sending of the final order-assuring element through the signal lines 134a and 134e to the order-assuring access request control circuit 220.

When the order-assuring access request control circuit 220 has received the signals indicative of the sending of the final order-assuring element from both of the order-assuring element issuing circuits 228a and 228e, it sends the signal for resuming the sending of the access request from the access request stack circuit to the sending control circuits 216a and 216b through the signal line 126.

Then, the sending control circuit 216a sends a signal for sending the signal, indicative of the stack position from which the next access request is to be fetched, to the stack output control circuit 210a through the signal line 122a and sends a signal for resuming the sending of the access request to the access request stack circuit 250a through the signal line 125a. On the other hand, the sending control circuit 216b sends a signal for sending the signal, indicative of the stack position from which the next access request is fetched, to the stack output control circuit 210b through the signal line 122b while sending the signal for resuming the sending of the access request to the access request stack circuit 250b through the signal line 125b.

After the stack output control circuits 210a and 210b have received the signals, they send the signals, indicative of the stack positions from which the access requests are to be fetched, to the stacks through the respective signal lines 121a and 121b.

Upon receipt of the signal from the sending control circuit 216a, the access request stack circuit 250a sends the access request from the stack indicated by the stack output control circuit 210a through the signal line 132a to the store bank selecting circuit 222a. Likewise, the access request stack circuit 250b sends the access request from the stack indicated by the stack output control circuit 210b through the signal line 132b to the store bank selecting circuit 222b when the access request stack circuit 250b has received the signal from the sending control circuit 216b.

Thereafter, the ordinary processing is repeated until the order-assuring access request is detected.

It is to be noted in these procedures that the instruction to be sent from the first priority control circuit is the same even if the order-assuring access request would appear in the access request stack circuit 250a or 250b, no matter which is earlier, and that this can be true of the other first priority control circuit 200B or 200D as shown in FIG. 8.

Figure 12:
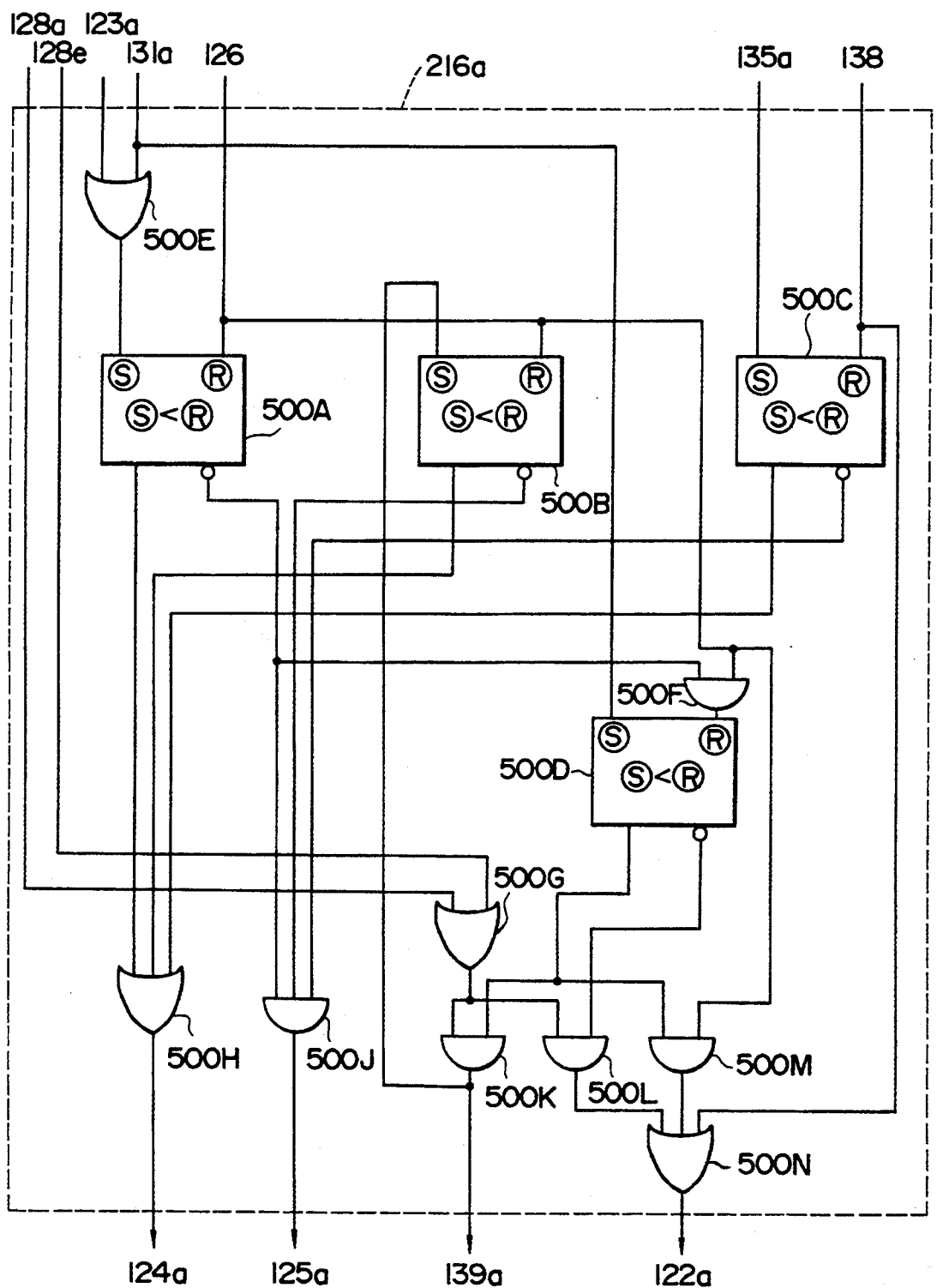

FIG. 12 shows the details of a logic circuit of the sending control circuit 216a.

As shown in FIG. 12, reference symbols 500A–500D denote reset-priority flip-flops which can retain '1', when the S input is '1' and which convert the retained value into '0' when the R input is '0'. When both the S input and the R input are '1', the flip-flop is of the reset-priority and it outputs '0'.

Referring to FIG. 12, the output terminal provided with the circle mark denotes the inverse output. Reference symbols 500E, 500G, 500H and 500N denote OR gates, while reference symbols 500F and 500J–500M denote AND gates.

The circuit configuration of the sending control circuit 216b is the same as that of the sending control circuit 216a.

Figure 13:
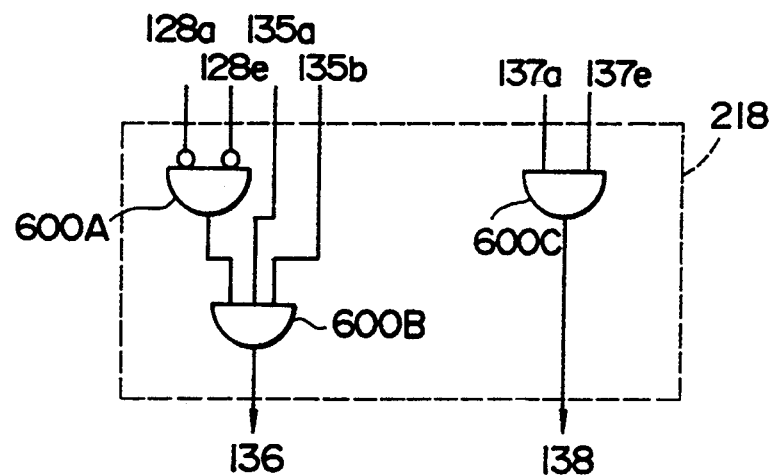

FIG. 13 shows the details of a logic circuit of the first synchronous element control circuit 218 in which reference symbols 600A, 600B and 600C denote AND gates.

Figure 14:
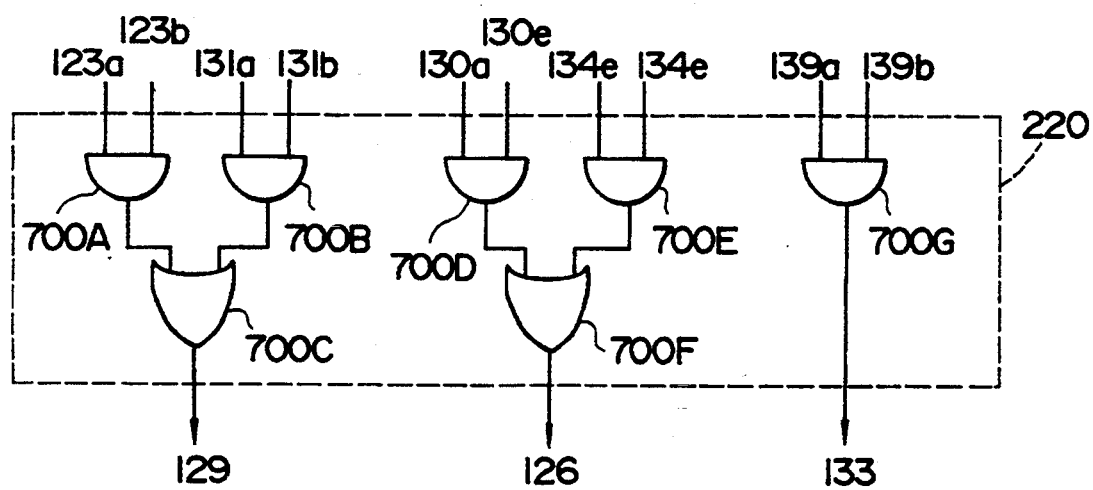

FIG. 14 shows the details of a logic circuit of the order-assuring access request control circuit 220. In FIG. 14, reference symbols 700A, 700B, 700D, 700E and 700G denote AND gates and reference symbols 700C and 700F denote OR gates.

C. Details of procedures subsequent to the first priority control circuit (FIG. 10)

Ordinary operation will be described first.

As shown in FIG. 8, the order-assuring element and the access request to be sent through the signal line 127a from the first priority control circuit 200A are held in the access request holding circuit 300A, while the order-assuring element and the access request to be sent through the signal line 127e therefrom are held in the access request holding circuit 300E. Similar relationships hold for all of the order-assuring elements and the access requests to be sent through the other signal lines 127b, 127f, 127c, 127g, 127d and 127h from the first priority control circuits 200B, 200F, 200C, 200G, 200D and 200H, respectively, which are held in the access request holding circuits 300B, 300F, 300C, 300G, 300D and 300H, respectively.

The access requests sent to the access request holding circuits 300A, 300B, 300C and 300D through the signal lines 127a, 127b, 127c and 127d from the order-assuring element issuing circuits 228a and 228e are held by the access request stack circuits 350a, 350b, 350c and 350d, respectively.

For instance, the access request stack circuit 350a comprises stacks T0 (350aA), T1 (350aB), T2 (350aC), T3 (350aD) and T4 (350aE) and the access request is held in one of these stacks as indicated by the stack input control circuit 308a.

The stack input control circuit 308a is a circuit for designating the stack positions T0 to T4 in which the access request is stored to the stack through a signal line 140a and, whenever one access request has been stored therein, sends through the signal line 140a a signal, indicative of the stack position in which the access request is stored next, as indicated by: T0→T1→T2→T3→T4→T0.

The access request stack circuit 350a sends the access request stored in the stacks T0 to T4 through a line 152a to the access request priority control circuit 440 from the stack positions, i.e. stack T0, as indicated by the stack output control circuit 310a, in accordance with a control signal from a sending control circuit 416a.

The stack output control circuit 310a is a circuit for designating the stack positions T0, T1, T2, T3, and T4, from which the access request is fetched, to the stack through the signal line 141a. The stack output control circuit 310a sends a signal, indicative of the stack position from which the access request is fetched next, in the manner as indicated by T0→T1→T2→T3→T4→T0, through the signal line 141a in accordance with the control by the sending control circuit 416a, whenever one access request is fetched.

The access request stack circuit 350b, stack input control circuit 308b and the stack output control circuit 310b can be operated in the same manner as described hereinabove.

The second access request priority control circuit 440 sends the access request sent from the access request stack circuit 350a or 350b, whichever earlier arrived, to the main storage 500A.

At this time, when the access requests have arrived at the second access request priority control circuit 440, the access requests sent from the access request stack circuit 350a, 350b, 350c and 350d are sent in this order to the main storage 500A.

When the second access request priority control circuit 440 has sent to the main storage 500A the access request sent, for example, from the access request stack circuit 350a, the second access request priority control circuit 440 sends a signal, indicative of the sending of the access request to the main storage 500A, through a signal line 148a to the sending control circuit 416a.

The sending control circuit 416a then instructs the stack output control circuit 310a through a signal line 142a to tell the stack via signal line 141a, the stack position in which the access request is to be fetched next. The stack output control circuit 310a then performs this function.

The access request stack circuit 350a starts or suspends the sending of the access request in response to the signal received when the access request stack circuit 350a receives either of the signal for sending the access request through a signal line 145a from the sending control circuit 416a or the signal for suspending the sending of the access request through a signal line 144a from the sending control circuit 416a.

Likewise, the second access request priority control circuit 440 sends to the sending control circuit 416b through a signal line 148b a signal indicative of the sending of the access request to the main storage 500A, when the access request sent from the access request stack circuit 350b is sent to the main storage 500A. The processing is then repeated in the same manner as described hereinabove.

Description will now be made of the operation for assuring the order of elements.

As shown in FIG. 10, the access request holding circuit 300A is so disposed as to allow the access request stack circuit 350a to hold the access request sent through a signal line 127a from the first control circuit 200A. Likewise, the access request holding circuit 300B allows the access request stack circuit 350b to hold the access request sent through a signal line 127b from the first priority control circuit 200B.

When the order-assuring element detecting circuit 414a has received the access request held in the stack identified by the stack output control circuit 310a of the access request stack circuit 350a through a signal line 159a, the order-assuring element detecting circuit 414a determines if the access request is an element for assuring order. Likewise, when the order-assuring element detecting circuit 414b has received the access request held in the stack identified by the stack output control circuit 310b of the access request stack circuit 350b through a signal line 159b, it determines if the access request is an element for assuring order. In other words, it determines if bits 1, 2 and 3 of the access request are '011'.

When it is detected that the access request held in the stack identified by the stack output control circuit 310a in the access request stack circuit 350a is an element for assuring order, the order-assuring element detecting circuit 414a sends through a signal line 143a to the respective sending control circuits 416a and 416b signals indicative of occurrence of the order-assuring element.

Upon receipt of the signal from the stack output control circuit 310a, the sending control circuit 416a sends a signal for suspending the sending of the access request through a signal line 144a to the access request stack circuit 350a.

Next, when it is detected that the access request held in the stack identified by the stack output control circuit 310b in the access request stack circuit 350b is an element for assuring order, the order-assuring element detecting circuit 414b sends through a signal line 143b to the respective sending control circuits 416a and 416b signals indicative of occurrence of the order-assuring element.

Upon receipt of the signal from the stack output control circuit 310b, the sending control circuit 416b sends a signal for suspending the sending of the access request through a signal line 144b to the access request stack circuit 350b.

When the sending control circuit 416a has received the signals from both of the order-assuring element detecting circuits 414a and 414b through the respective signal lines 143a and 143b and detected that all of the order-assuring elements exist, it sends a signal to the stack output control circuit 310a through the signal line 142a, for renewing the stack position from which the access request is fetched. Likewise, when the sending control circuit 416b has received the signals from both of the order-assuring element detecting circuits 414a and 414b through the respective signal lines 143a and 143b and detected that all of the order-assuring elements existed, it sends to the stack output control circuit 310b through the signal line 142b a signal for renewing the stack position from which the access request is fetched.

The signals for renewing the stack positions are received by the stack output control circuits 310a and 310b and then sent to the corresponding stacks through the signal lines 141a and 141b.

It is now noted that the processing which follows varies with the kind of the access request held in the stack indicated by the stack output control circuits 310a and 310b of the respective access request stack circuits 350a and 350b.

(a) When the access request held in the stack indicated by the stack output control circuit 310a of the access request stack circuit 350a is an access request for assuring order:

The sending control circuit 416a sends a signal for resuming the sending of the access request to the access request stack circuit 350a through the signal line 145a when the sending control circuit 416a has received the signals from the second access request priority control circuit 440 through the signal lines 148a and 148b, the signal being indicative of the fact that the preceding access request has been sent to the main storage 500A.

The access request stack circuit 350a keeps sending the access requests in response to the signal from the sending control circuit 416a whenever the stack positions are renewed, until the signal for suspending the sending of the access request is sent from the sending control circuit 416a through the signal line 144a.

When the order-assuring element detecting circuit 414a detects the next order-assuring element, it transmits a signal to this effect to the sending control circuits 416a and 416b through the signal lines 143a.

Then, the sending control circuit 416a sends to the access request stack circuit 350a through the signal line 144a a signal for suspending the sending of the access request, when it has received the signal indicative of occurrence of the next order-assuring element from the sending control circuit 416a.

On the other hand, the sending control circuit 416b performs a different processing in accordance with the kind of the access request held in the stack as indicated by the stack output control circuit 310b of the access request stack circuit 350b.

(a.i) When the access request held in the stack indicated by the stack output control circuit 310b of the access request stack circuit 350b is an access request for assuring order:

Upon receipt of the signal from the order-assuring element detecting circuit 414a, the sending control circuit 416b sends a signal for resuming the sending of the access request to the access request stack circuit 350b through the signal line 145b.

Then, the access request stack circuit 350b keeps transmitting the access requests until a signal for suspending the sending of the access request is sent from the sending control circuit 416b through the signal line 144b.

When the order-assuring element detecting circuit 414b detects the next element for assuring order, it then transmits a signal indicative of occurrence of the next order-assuring element to the sending control circuits 416a and 416b through the signal line 143b.

When the signal indicative of the occurrence of the next order-assuring element from the order-assuring element detecting circuit 414b has been received, the sending control circuit 416b transmits a signal for suspending the sending of the access request to the access request stack circuit 350b through the signal line 144b and further transmits a signal to the stack output control circuit 310b through signal line 142b for renewing the stack position from which the access request is to be fetched.

Further, the sending control circuit 416b transmits a signal for renewing the stack position from which the access request is to be fetched to the stack output control circuit 310a through the signal line 142a.

Then, the stack output control circuits 310a and 310b send the signals to the access request stack circuits 350a and 350b through the signal lines 141a and 141b, respectively, so as to renew the stacks.

(a.ii) When the access request held in the stack indicated by the stack output control circuit 310b of the access request stack circuit 350b is an element for assuring order:

This instance differs from the case in which the access request held in the stack indicated by the stack output control circuit 310b of the access request stack circuit 350b is the access request for assuring order, as described hereinabove. In this case, the order-assuring element detecting circuit 414b detects the next element immediately after the stack output control circuit 310b has renewed the stack positions.

Therefore, the access request stack circuit 350b does not resume the sending of the access requests.

Further, the order-assuring element detecting circuit 414b sends the signal indicative of occurrence of the next order-assuring element through the signal line 143b to the sending control circuits 416a and 416b.

Upon receipt of this signal, the sending control circuits 416a and 416b transmit the signals for renewing the stack positions from which the access request is fetched to the stack output control circuits 310a and 310b through the signal lines 142a and 142b, respectively.

Then, the stack output control circuits 310a and 310b transmit the signals for renewing the stack positions to the corresponding stacks through the respective signal lines 141a and 141b.

(b) When the access request held in the stack indicated by the stack output control circuit 310a of the access request stack circuit 350a is an element for assuring order:

This instance differs from the case (a), as described hereinabove, in which the access request held in the stack indicated by the stack output control circuit 310a of the access request stack circuit 350a is the access request for assuring order. In this case, the order-assuring element detecting circuit 414a detects the order-assuring element immediately after the stack position has been renewed by the stack output control circuit 310a. Therefore, no access request is sent from the request stack circuit 350a.

Further, the order-assuring element detecting circuit 414a transmits a signal indicative of occurrence of the next order-assuring element to the sending control circuits 416a and 416b through the signal line 143a.

Upon receipt of this signal, the sending control circuit 416a keeps sending signals for suspending the sending of the access request to the access request stack circuit 350a through the signal line 144a.

The processing which follows is the same as in the case as described in item (a) hereinabove; thus, description thereof will be omitted.

The aforesaid processing is repeated until the order-assuring element detecting circuit 414a has detected the final element for assuring order. Once the final element for assuring order has been detected, the order-assuring element detecting circuit 414a transmits signals to this effect to both of the sending control circuits 416a and 416b through the signal line 149a.

Upon receipt of the signal indicative of occurrence of the final order-assuring element from the order-assuring element detecting circuit 414a, the sending control circuit 416a sends the signal for suspending the sending of the access request to the access request stack circuit 350a through the signal line 144a.

On the other hand, the sending control circuit 416b sends the signal for resuming the sending of the access request to the access request stack circuit 350b through the signal line 145b, when it has received the signal from the order-assuring element detecting circuit 414a that the access request held in the stack indicated by the stack output control circuit 310b of the access request stack circuit 350b is the access request for assuring order.

The access request stack circuit 350b keeps sending the access request until the signals for suspending the sending of the access request are sent from the sending control circuit 416b through the signal line 144b.

When the final order-assuring element has been detected, the order-assuring element detecting circuit 414b transmits a signal indicative of the occurrence of the final element for assuring order to the sending control circuits 416a and 416b through the signal line 149b.

Upon receipt of the signal indicative of the occurrence of the final order-assuring element from the order-assuring element detecting circuit 414b, the sending control circuit 416b sends the signal for suspending the sending of the access requests to the access request stack circuit 350b through the signal line 144b. Further, the sending control circuit 416b transmits a signal to the stack output control circuit 310b through the signal line 142b for renewing the stack positions from which the access requests are fetched.

Likewise, the sending control circuit 416a transmits a signal for renewing the stack positions from which the access requests are to be fetched to the stack output control circuit 310a through the signal line 142a, when it has received the signal indicative of the occurrence of the final order-assuring element from the order-assuring element detecting circuit 414b.

The stack output control circuits 310a and 310b then send signals for renewing the stack positions to the access request stack circuits 350a and 350b through the signal lines 141a and 142b, respectively.

When the sending control circuit 416a has received the signal from the second access request priority control circuit 440 through the signal line 148a, the signal being indicative of the sending of the preceding access request to the main storage 500A, the sending control circuit 416a transmits a signal for resuming the sending of the access request to the access request stack circuit 350a through the signal line 145a. Likewise, the sending control circuit 416b transmits the signal for resuming the sending of the access request to the access request stack circuit 350b through the signal line 145b, when the sending control circuit 416a has received the signal from the second access request priority control circuit 440 through the signal line 148b, which signal is indicative of the sending of the preceding access request to the main storage 500A.

Then, both of the access request stack circuits 350a and 350b resume the sending of the access requests upon receipt of the signals for resuming the sending of the access requests from the sending control circuits 416a and 416b, respectively, followed by the return to ordinary processing.

The aforesaid processing can be applied in the same manner to the access request holding circuits 300C and 300D as well as the access request sending control circuit 430b. The same thing can be said of the access request holding circuits 300E and 300H as well as the second priority control circuit 400B.

Description will be made of a specific example of the operation for processing after the first priority control circuit.

The order-assuring access requests from the 0th element to the 15th element issued by the vector data processor 100A are held in the access request holding circuits 300A, 300B, 300C and 300D sent from the first priority control circuits 200A and 200B, as follows:

300A: $0^{th}$, $1^{st}$, $8^{th}$, $12^{th}$ element

300B: $2^{nd}$, $3^{rd}$, $6^{th}$, $14^{th}$ element

300C: $4^{th}$, $5^{th}$, $9^{th}$, $13^{th}$ element

300D: $7^{th}$, $10^{th}$, $11^{th}$, $15^{th}$ element

In this case, the order-assuring element, the access request of the 0th element, the access request of the 1st element, the order-assuring element, the order-assuring access request of the 8th element, the order-assuring element, the access request of the 12th element, and the final order-assuring element are stacked in this order in the access request stack circuit 350a by the first priority control circuit.

Further, the order-assuring element, the access request of the 2nd element, the access request of the 3rd element, the order-assuring element, the access request of the 6th element, the order-assuring element, the order-assuring element, the access request of the 14th element, and the final order-assuring element are stacked in this order in the access request stack circuit 350b by the first priority control circuit.

Consequently, the following elements are stored in the access request holding circuits 300A and 300B:

300A: Sy1, 0, 1, Sy1, Sy1, 8, Sy1, 12, and Sy2

300B: Sy1, 2, 3, Sy1, 6, Sy1, Sy1, 14, Sy2

(wherein Sy1 denotes an order-assuring element; and Sy2 denotes a final order-assuring element).

When all of the first order-assuring elements have been received and the preceding access request has been transmitted to the main storage 500A, the second priority control circuit 400A sends the order-assuring access request of the 0th element and then the order-assuring access request of the 1st element.

At this time, the signal indicative of the 0th element having been sent to the main storage 500A is sent to the second access request priority control circuit 440 through the signal line 148a, so that the 0th element is always given access to the main storage earlier than the 1st element.

Further, the access request to be fetched next from the access request stack circuit 350a is suspended from being sent, and the 2nd element is transmitted from the access request stack circuit 350b, followed by sending the 3rd element.

In this case, likewise, the 2nd element is given access to the main storage 500A earlier than the 3rd element.

As described hereinabove, the second access request priority control circuit 440, too, transmits the access requests to the main storage 500A in the order as arrived earlier. Thus, the 1st element is given access to the main storage 500A earlier, because the 1st element is transmitted to the access request priority control circuit 440 earlier than the 2nd element.

As described hereinabove, likewise, the order-assuring elements are given access to the main storage in synchronization with each other, in the order of the 0th, 1st, 2nd, 3rd, 6th, 8th, 12th and 14th elements, because the transmission of the access request from the access request stack circuit 350a is made earlier.

The access requests sent to the access request holding circuits 300E and 300F are likewise given access to the main storage 500A in the order of the 4th, 5th, 7th, 9th, 10th, 11th, 13th and 15th elements.

In this embodiment, the access request of the vector data to be given access to the main storage in the order of the vector elements issue elements for assuring the order of the access requests and realized by implementing control over priority.

Figure 15:
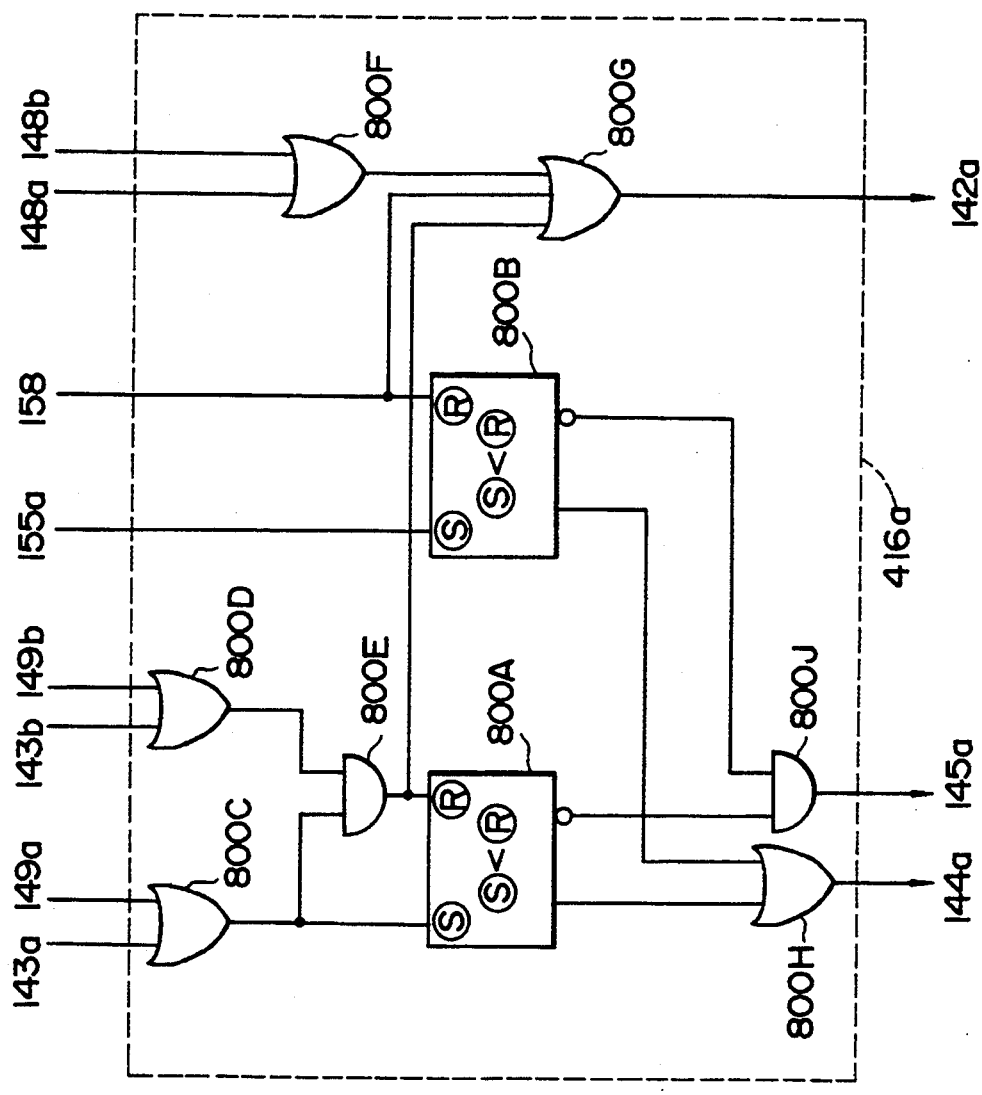

FIG. 15 shows part of the sending control circuit 416a. In FIG. 15, reference symbols 800A and 800B denote flip-flops of reset-priority, reference symbols 800C, 800D, 800F, 800G and 800H denote OR gates, and reference symbols 800E and 800J denote AND gates.

Figure 16:
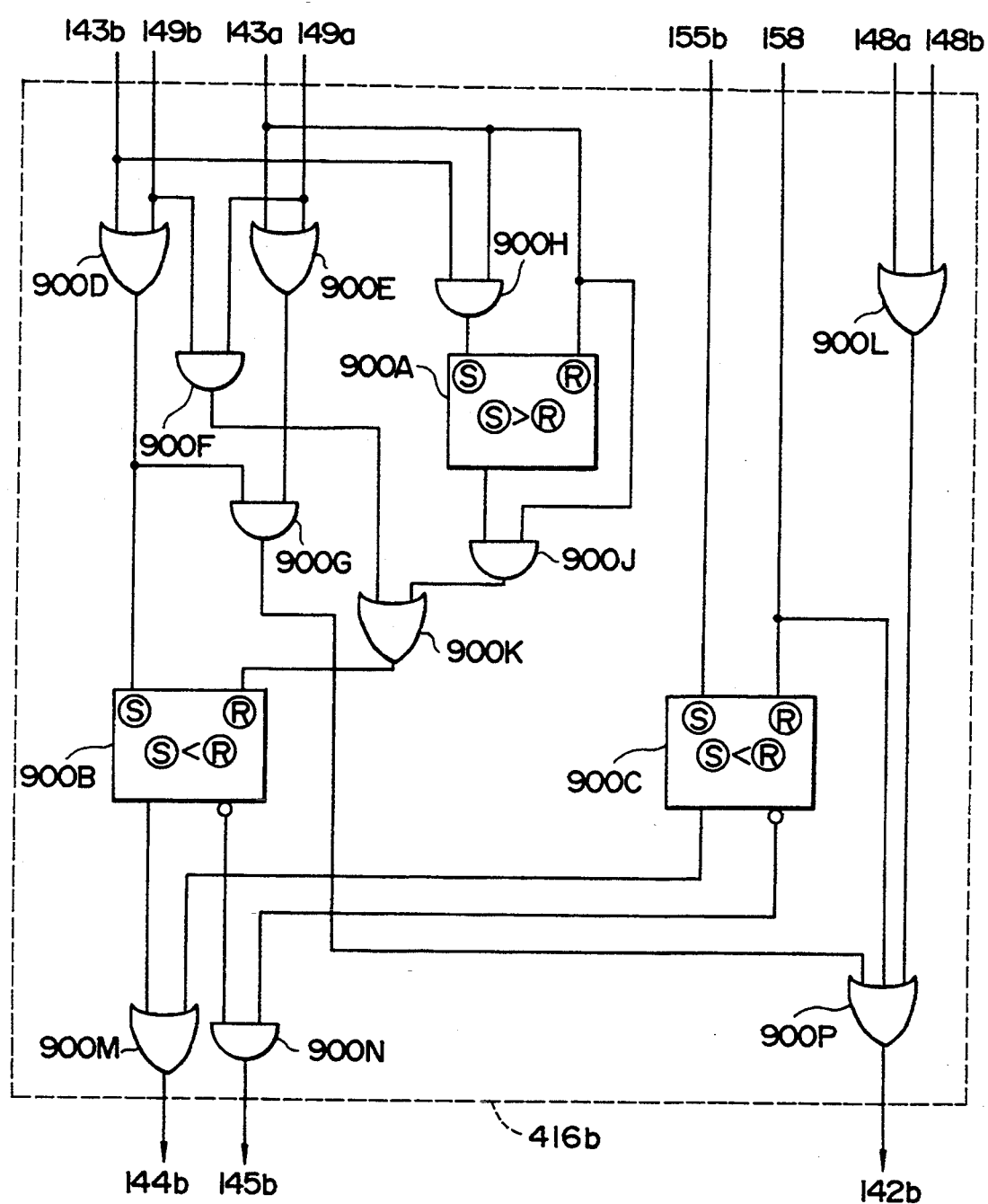

FIG. 16 shows the details of a logic circuit of the sending control circuit 416b. As shown in FIG. 16, reference symbol 900A is a set-priority flip-flop whose output becomes '1' when the S input and the R input are given '1' at the same time. Reference symbols 900B and 900C denote reset-priority flip-flops, reference symbols 900D, 900E, 900K–900M and 900P are OR gates, and reference symbols 900F–900H, 900J and 900N denote AND gates.

(2) Assuring the order between the vector data:

When the order of access to the main storage between the preceding vector data and the subsequent vector data is assured, the vector data processor 100A (FIG. 8) issues four of the first synchronous elements in synchronization with the vector data and sends them to the first priority control circuits 200A and 200B through the signal lines 118a–118b and 118c–118d, respectively.

Two out of the four first synchronous elements issued by the vector data processor 100A are sent to the access request stack circuits 250a and 250b through the respective signal lines 118a and 118b (FIG. 9).

In the access request stack circuit 250a, the first synchronous element detecting circuit 212a determines if the access request held in the stack indicated by the stack output control circuit 210a is a first synchronous element. Likewise, the first synchronous element detecting circuit 212b determines if the access request held in the stack indicated by the stack output control circuit 210b is a first synchronous element. In other words, it is determined if bits 1 and 2 of the access request are '10'.

When the first synchronous element detecting circuit 212a has detected the access request held in the stack indicated by the stack output control circuit 210a of the access request stack circuit 250a as a first synchronous element, the first synchronous element detecting circuit 212a sends a signal indicative of occurrence of the first synchronous element to the sending control circuit 216a and the first synchronous element control circuit 218 through a signal line 135a.

Upon receipt of the signal indicative of the occurrence of the first synchronous element, the sending control circuit 216a transmits the signal for suspending the sending of the access request to the access request stack circuit 250a through the signal line 124a.

When the first synchronous element detecting circuit 212b has detected the access request held in the stack indicated by the stack output control circuit 210b of the access request stack circuit 250b as a first synchronous element, the first synchronous element detecting circuit 212b sends a signal indicative of occurrence of the first synchronous element to the sending control circuit 216b and the first synchronous element control circuit 218 through a signal line 135b.

Upon receipt of the signal indicative of the occurrence of the first synchronous element, the sending control circuit 216b transmits the signal for suspending the sending of the access request to the access request stack circuit 250b through the signal line 124b.

Then, the first synchronous element control circuit 218 sends a signal for issuing a second synchronous element to the second synchronous element issuing circuits 224a and 224b through a signal line 136, when the first synchronous element control circuit 218 has received the signals indicative of the occurrence of the first synchronous element from the first synchronous element detecting circuits 212a and 212b through the signal lines 135a and 135b and it has received the signals through the signal lines 128a and 128b from the first access request priority control circuits 226a and 226e.

The signal sent by the control circuit 218 indicates that all of the preceding access requests have been sent through the signal lines 127a and 127e.

Upon receipt of the signal for issuing the second synchronous element through the signal line 136 from the first synchronous element control circuit 218, the second synchronous element issuing circuits 224a and 224e issue the second synchronous elements to the access request holding circuits 300A and 300E through the signal lines 127a and 127e, respectively, while sending a signal to this effect to the first synchronous element control circuit 218 through the signal lines 137a and 137e.

When the signals have been received from both of the second synchronous element control circuits 224a and 224e through the respective signal lines 137a and 137e, the first synchronous element control circuit 218 sends a signal for resuming the sending of the subsequent access requests to the sending control circuits 216a and 216b through the signal line 138.

Then, the sending control circuits 216a and 216b transmit signals for renewing the stack positions from which the access requests are to be fetched to the stack output control circuits 210a and 210b through the signal lines 122a and 122b, respectively. Thereafter, the stack output control circuits 210a and 210b send signals for renewing the stack positions to the stacks in the access request stack circuits 250a and 250b through the signal lines 121a and 121b, respectively.

Thereafter, the sending control circuits 216a and 216b send signals for sending the access requests through the signal lines 125a and 125b to the access request stack circuits 250a and 250b. The access request stack circuits 250a and 250b then return to ordinary processing for sending the access requests.

As shown in FIG. 10, in the access request holding circuits 300A and 300B, the second synchronous elements and the access requests sent through the signal lines 127a and 127b from the first priority control circuits 200A and 200B are held in the respective access request stack circuits 350a and 350b, respectively.

When the second synchronous element detecting circuit 412a has detected the access request held in the stack indicated by the stack output control circuit 310a as a second synchronous element, the second synchronous element detecting circuit 412a sends a signal indicative of occurrence of the second synchronous element to the sending control circuit 416a and the second synchronous element control circuit 418 through a signal line 155a.

Upon receipt of the signal indicative of the occurrence of the first synchronous element, the sending control circuit 416a transmits the signal for suspending the sending of the access request to the access request stack circuit 350a through the signal line 144a.

When the second synchronous element detecting circuit 412b has detected the access request held in the stack indicated by the stack output control circuit 310b of the access request stack circuit 350b as the second synchronous element, the first synchronous element detecting circuit 412b sends a signal indicative of occurrence of the second synchronous element to the sending control circuit 416b and the second synchronous element control circuit 418 through a signal line 155b.

Upon receipt of the signal indicative of the occurrence of the first synchronous element, the sending control circuit 416b transmits the signal for suspending the sending of the access request to the access request stack circuit 350b through the signal line 144b.

Then, the second synchronous element control circuit 418 sends a signal for resuming the processing of the subsequent access requests to the sending control circuits 416a and 416b through a signal line 158, when the second synchronous element control circuit 418 has received the signals indicative of the occurrence of the second synchronous element from the second synchronous element detecting circuits 412a and 412b through the signal lines 155a and 155b and has received the signals through the signal lines 148a and 148b from the second access request priority control circuit 440. The signal sent by the control circuit 418 indicates that all of the preceding access requests have been sent through the signal line 147.

Thereafter, the sending control circuit 416a sends a signal for renewing the stack position from which the access request is fetched to the stack output control circuit 310a through the signal line 142a, while the sending control circuit 416b sends a signal for renewing the stack position from which the access request is fetched to the stack output control circuit 310b through the signal line 142b. The stack output control circuits 310a and 310b send signals for renewing the stack positions to the stacks through the signal lines 141a and 141b, respectively.

The sending control circuit 416a transmits a signal for sending the access request to the access request stack circuit 350a through the signal line 145a. Likewise, the sending control circuit 416b transmits a signal for sending the access request to the access request stack circuit 350b through the signal line 145b. Then, the access request stack circuits 350a and 350b send the access requests and return to ordinary processing.

As shown in FIG. 8, in the embodiment of the present invention in which the control is implemented for determining the priority of access to the main storage in multiple stages, the processing of the order of access between the vector data is realized at a high speed in order to allow the first and second priority control circuits 200A and 400A to perform operations independently from each other, when the access request is sent from the first priority control circuit 200A through the access request holding circuit 300A to the second priority control circuit 400A.

In other words, the first priority control circuit 200A can process the access request following the second synchronous element without waiting for the sending of the access request preceding the second synchronous element from the second priority control circuit 400A to the main storage 500A. On the other hand, the second priority control circuit 400A immediately resumes the processing because the access request subsequent to the second synchronous element is sent to the access request holding circuit 300A.

FIG. 13 shows the details of a logic circuit of the first synchronous element control circuit 218, in which reference symbol 600A denotes an AND gate which is provided with an inverting function and reference symbols 600B and 600C denote AND gates.

Figure 17:
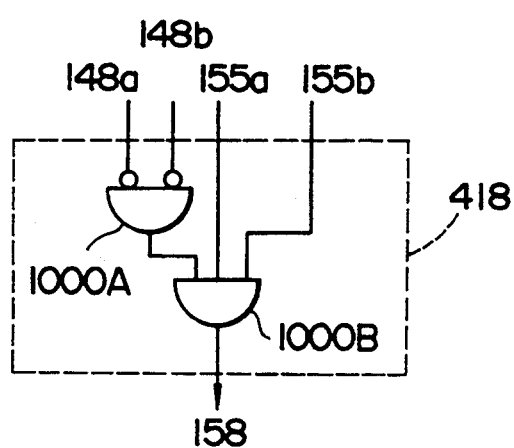

FIG. 17 shows the details of a logic circuit of the second synchronous element control circuit 418, in which reference symbol 1000A denotes an AND gate whose input is provided with an inverting function and reference symbol 1000B denotes an AND gate.

In the above embodiments, description has been made of synchronization when the vector data processor 100A issues the access requests for identical vector data at the same time. The embodiments as described hereinabove also apply to the processing for assuring the order between the vector data in instances where the vector data processor 100A issues the access requests for different vector data at the same time.

In other words, as shown in FIG. 8, the first priority control circuits 200A and 200B perform the processing for synchronizing each of a plurality of the vector instructions independently from each other, when the vector data processor 100A issues every two access requests of first vector data in order through the signal lines 118a and 118b and every two access requests of second vector data through the signal lines 118c and 118d. Further, the second priority control circuit 400A processes the access request sent through the signal lines 152a and 152b in the manner as described hereinabove.

With this arrangement, the processing for synchronizing the vector instructions with each other for assuring the order among the vector data can likewise be realized.

As described hereinabove, the present invention provides a computer system which can execute at a high speed the processing for assuring the order between the vector elements of the vector data in instances where the number of access requests to be issued simultaneously by the vector data processor increases.

Further, the present invention can provide the computer system which can execute the processing for assuring the order between the vector data at a high speed in instances where the number of access requests issued simultaneously be the vector data processor increases.

What is claimed is:

1. A store control system for a computer system having a storage containing a plurality of independently accessible store banks, a plurality of access request controllers for issuing access requests to the storage, and a store controller for transmitting the access requests issued by the plurality of the access request controllers to each of the store banks of the storage, wherein:

the store controller comprises a multiple-stage access request priority determining circuit for determining an order of priority among access requests issued by the plurality of access request controllers for each of the store banks;

the access request controller has a plurality of access request control circuits; and the access request is processed in such a manner that, when the access request control circuits perform synchronous and parallel operation to issue access requests, the access request priority determining circuit of plural stages has its access request priority determining circuit of first stage perform synchronous control of the access requests and its access request priority determining circuit of subsequent stages perform control of the access requests individually and independently from each other.

2. A store control system of a computer system having a storage comprising a plurality of independently accessible store banks, a plurality of access request controllers for issuing access requests to the storage, and a store controller for allowing an access request priority determining circuit of multiple stages to determine an order of priority between the access requests issued by the plurality of the access request controllers and for sending determined access requests to the store banks, comprising:
- first means for dividing the access requests into plural groups in an order of occurrence of the access requests and sending each of the access requests of each of the groups to an access request priority determining circuit of first stage after an access request identification data of first stage is added to each of the access requests thereof;
- second means for storing a device number of the access request controller and the access request identification data of first stage, an access request controller being a sender of the access request sent to the access request priority determining circuit of first stage;
- third means for dividing the access requests sent from the access request priority determining circuit of first stage into plural groups in an order of transmission of the access requests and sending each of the access requests of each of the groups to an access request priority determining circuit of second stage after an access request identification data of second stage is added to each of the access requests thereof;
- fourth means for storing a device number of the access request controller and the access request identification data of second stage, an access request controller being a sender of the access request sent to the access request priority determining circuit of second stage;
- fifth means for receiving report data indicative of access request selection performed by the access request priority determining circuit of second stage, the selected access requests having been sent from the access request priority determining circuit of first stage, and for transmitting the report data to the access request priority determining circuit of first stage in the order of transmission of the access requests from the access request priority determining circuit of first stage, wherein said transmission is performed on the basis of the device number and the access request identification data of second stage; and
- sixth means for detecting the report data, reporting on selection of the access requests, and for returning report data to the originating access request controller in an order of issuance of the access requests on the basis of the device number and the access request identification data of first stage.

3. A store control system for a computer system as claimed in claim 2, further comprising:
- a read data buffer corresponding to the access request priority determining circuit of plural stages; and
- means for sending data read from the read data buffer to a read data buffer of a subsequent stage in the order of acceptance of the access requests in the access request priority determining circuit of each stage.

4. A store control system for a computer system as claimed in claim 2, further comprising means for returning the report data to the originating access request controller by detecting the report data indicative of the access request priority determining circuit of second stage having selected all access requests with the access request identification data of first stage added thereto from the access request controller through the access request priority determining circuit of each stage, after the access request controller processes the access requests issued by the access request controller in synchronization with and parallel to each other.

5. A store control system for a computer system having a main storage comprising a plurality of store banks; a vector data processor simultaneously issuing plural main store access requests to vector elements of vector data; a plurality of first priority control circuits for performing control of priority of the main store access requests allotted and accepted for two or more vector elements in accordance with an order of the vector elements constituting the vector data and transmitting the main store access requests to a second priority control circuit so disposed as to correspond to the store bank to which access is made; and a plurality of the second priority control circuits for accepting the main store access requests for the corresponding store bank from each of the first priority control circuits and performing control of priority between the main store access requests accepted; wherein:
- access is made to the main storage while assuring an order of the vector elements constituting the vector data:
- by allowing each of the first priority control circuits to transmit the main store access requests to the second priority control circuits corresponding to the store bank to which access is made by assuring the order of the main store access requests accepted simultaneously; and
- by allowing the second priority control circuit to transmit the main store access requests in accordance with the order of the vector elements constituting the vector data for a corresponding store bank by assuring the order of the accepted main store access requests for each of the first priority control circuits.

6. A store control system for a computer system as claimed in claim 5, wherein access is made to the main storage while assuring the order of the vector elements constituting the vector data:
- by allowing the vector data processor to issue the access request for assuring the order of a vector element constituting final vector data as a final order-assuring access request and allowing the first priority control circuit to transmit all final synchronous elements to the second priority control circuit after the final order-assuring access request has been processed; and
- by allowing the second priority control circuit to assure the main store access requests accepted prior to a final synchronous element for each of the first priority control circuits.

7. A store control system for a computer system as claimed in claim 5, wherein access is made to the main storage while assuring the order of the vector elements constituting the vector data:
- by allowing the vector data processor to issue the main store access request of the vector element as an order-assuring access request;
- by allowing each of the first priority control circuits to issue all order-assuring elements to the second priority control circuit whenever the order-assuring access requests are accepted, and by assuring the order of the main store access requests simultaneously accepted by transmitting two or more order-assuring access requests simultaneously accepted to the second priority control circuit corresponding to the store bank to which access is made, in accordance with the order of the vector elements; and by assuring an order of the accepted main store access requests in each of the first priority control circuits by synchronizing the order-assuring access requests from each of the first priority control circuits on the basis of the order-assuring elements from each of the first priority control circuits and by transmitting the main store access requests in order to the main storage in accordance with the order-assuring access requests accepted from each of the first priority control circuits in the order of the first priority control circuits corresponding to the order of the accepted main store access requests.

8. A store control system for a computer system as claimed in claim 7, wherein access is made to the main storage while assuring the order of the vector elements constituting the vector data:

by allowing the vector data processor to issue the access request for assuring the order of a vector element constituting final vector data as a final order-assuring access request and allowing the first priority control circuit to transmit all final synchronous elements to the second priority control circuit after the final order-assuring access request has been processed; and by allowing the second priority control circuit to assure the main store access requests accepted prior to a final synchronous element for each of the first priority control circuits.

9. A store control system for a computer system as claimed in claim 7, wherein:

access is made to the main storage by assuring the order between the vector data:

by allowing the vector data processor to issue a first synchronous element corresponding to each of the main store access requests for the vector elements constituting the vector data after the main store access request for the preceding vector data has been issued and to issue the main store access request for the vector element of the subsequent vector data;

by allowing each of the first priority control circuits to transmit all second synchronous elements to the second priority control circuit after the main store access requests accepted prior to the issued first synchronous element have been transmitted and then to transmit the main store access requests for the subsequent vector data to the second priority control circuit corresponding to the store bank to which the access is made; and by allowing the second priority control circuit to transmit the main store access requests for the vector elements of identical vector data in order while synchronizing the second synchronous elements from each of the first priority control circuits.

10. A store control system for a computer system as claimed in claim 5, wherein:

access is made to the main storage by assuring the order between the vector data:

by allowing the vector data processor to issue a first synchronous element corresponding to each of the main store access requests for the vector elements constituting the vector data after the main store access request for the preceding vector data has been issued and to issue the main store access request for the vector element of the subsequent vector data;

by allowing each of the first priority control circuits to transmit all second synchronous elements to the second priority control circuit after the main store access requests accepted prior to the issued first synchronous element have been transmitted and then to transmit the main store access requests for the subsequent vector data to the second priority control circuit corresponding to the store bank to which access is made; and by allowing the second priority control circuit to transmit the main store access requests for the vector elements of identical vector data in order while synchronizing the second synchronous elements from each of the first priority control circuits.

11. A store control system for a computer system having a main storage comprising a plurality of store banks; a vector data processor simultaneously issuing plural main store access requests for each of vector elements constituting vector data; and a plurality of first priority control circuits for allotting and accepting the main store access requests for at least two vector elements in accordance with the order of the vector elements constituting the vector data, performing control of priority between the main store access requests accepted, and transmitting the main store access requests to a second priority control circuit disposed in correspondence with the bank to which access is made; and a plurality of the second priority control circuits for accepting the main store access requests from each of the first priority control circuits for the corresponding bank; wherein:

access is made to the main storage while assuring the order of the vector data:

by allowing the vector data processor to issue a first synchronous element corresponding to each of the main store access requests for the vector elements constituting the vector data after the main store access request for the preceding vector data has been issued and to issue the main store access request for the vector element of the subsequent vector data;

by allowing each of the first priority control circuits to transmit all second synchronous elements to the second priority control circuit after the main store access request accepted prior to the accepted first sysnchronous element have been transmitted and then to transmit the main store access requests for the subsequent vector data to the second priority control circuit corresponding to the store bank to which access is made; and by allowing the second priority control circuit to transmit the main store access requests for the vector elements of identical vector data in order while synchronizing the second synchronous elements from each of the first priority control circuits.

* * * * *